(12) United States Patent
Li et al.

(10) Patent No.: US 12,551,145 B2
(45) Date of Patent: Feb. 17, 2026

(54) INTEGRATED THERMO-PHOTONIC CHEMICAL SENSOR

(71) Applicant: Cardiac Pacemakers, Inc., St. Paul, MN (US)

(72) Inventors: Yingbo Li, Woodbury, MN (US); Michael J. Kane, St. Paul, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 260 days.

(21) Appl. No.: 17/510,903

(22) Filed: Oct. 26, 2021

(65) Prior Publication Data

US 2022/0133234 A1     May 5, 2022

Related U.S. Application Data

(60) Provisional application No. 63/107,343, filed on Oct. 29, 2020.

(51) Int. Cl.
| | | |
|---|---|---|
| *A61B 5/1459* | (2006.01) | |
| *A61B 5/00* | (2006.01) | |
| *A61B 5/145* | (2006.01) | |

(52) U.S. Cl.
CPC ........ *A61B 5/1459* (2013.01); *A61B 5/14546* (2013.01); *A61B 5/6861* (2013.01); *A61B 2560/0252* (2013.01)

(58) Field of Classification Search
CPC . A61B 5/1459; A61B 5/14546; A61B 5/6861; A61B 5/01; A61B 2560/0252; A61B 5/1455
See application file for complete search history.

(56) References Cited

U.S. PATENT DOCUMENTS

| | | | |
|---|---|---|---|
| 556,421 A | | 3/1896 | Judge |
| 4,181,863 A | * | 1/1980 | Parker ............... H01L 31/02027 |
| | | | 250/552 |

(Continued)

FOREIGN PATENT DOCUMENTS

| | | |
|---|---|---|
| CN | 108968976 | 12/2018 |
| CN | 109381195 | 2/2019 |

(Continued)

OTHER PUBLICATIONS

J.H. Yu. In-situ analysis of thermal properties of polymer composites by embedded LED temperature sensor, Microelectronics Journal, vol. 44, Issue 11 [online]. Nov. 2013 [retrieved on May 15, 2024] Retrieved from the Internet <URL: https://www.sciencedirect.com/science/article/pii/S0026269213000232> (Year: 2013). <DOI: https://doi.org/10.1016/j.mejo.2013.01.010>.*

(Continued)

*Primary Examiner* — Alex M Valvis
*Assistant Examiner* — Jonathan M Haney
(74) *Attorney, Agent, or Firm* — Pauly, DeVries Smith & Deffner LLC

(57) ABSTRACT

Embodiments herein relate to integrated thermo-photonic chemical sensors as part of an implantable sensing device. In a first aspect, an implantable sensing device is included having a sensing element, an optical excitation assembly configured to illuminate the sensing element, an optical detection assembly configured to receive optical signals from the sensing element, and a control circuit, wherein the control circuit is configured to receive signals from the optical detection assembly, receive signals reflecting temperature, and process signals from the optical detection assembly while adjusting for the signals reflecting temperature. Other embodiments are also included herein.

15 Claims, 9 Drawing Sheets

(56) References Cited

U.S. PATENT DOCUMENTS

| | | | |
|---|---|---|---|
| 4,200,110 A | 4/1980 | Peterson et al. |
| 4,321,057 A | 3/1982 | Buckles |
| 4,344,438 A | 8/1982 | Schultz et al. |
| 4,399,099 A | 8/1983 | Buckles |
| 4,680,268 A | 7/1987 | Clark |
| 4,704,029 A | 11/1987 | Van Heuvelen |
| 4,721,677 A | 1/1988 | Clark |
| 4,750,494 A | 6/1988 | King |
| 4,750,495 A | 6/1988 | Moore et al. |
| 4,825,872 A | 5/1989 | Tan et al. |
| 4,890,621 A | 1/1990 | Hakky |
| 4,903,701 A | 2/1990 | Moore |
| 4,981,779 A | 1/1991 | Wagner |
| 5,001,054 A | 3/1991 | Wagner |
| 5,040,533 A | 8/1991 | Fearnot |
| 5,090,326 A | 2/1992 | Altenau et al. |
| 5,209,231 A | 5/1993 | Cote et al. |
| 5,267,151 A | 11/1993 | Ham et al. |
| 5,275,171 A | 1/1994 | Barcel |
| 5,312,439 A | 5/1994 | Loeb |
| 5,312,454 A | 5/1994 | Roline et al. |
| 5,330,718 A | 7/1994 | Hui et al. |
| 5,333,609 A | 8/1994 | Bedingham et al. |
| 5,342,406 A | 8/1994 | Thompson |
| 5,342,789 A | 8/1994 | Chick et al. |
| 5,355,880 A | 10/1994 | Thomas et al. |
| 5,378,432 A | 1/1995 | Bankert et al. |
| 5,419,329 A | 5/1995 | Smith et al. |
| 5,457,535 A | 10/1995 | Schmidtke et al. |
| 5,476,434 A | 12/1995 | Kalb et al. |
| 5,553,616 A | 9/1996 | Ham et al. |
| 5,556,421 A | 9/1996 | Prutchi et al. |
| 5,560,356 A | 10/1996 | Peyman |
| 5,605,152 A | 2/1997 | Slate et al. |
| 5,607,644 A | 3/1997 | Olstein et al. |
| 5,660,163 A | 8/1997 | Schulman et al. |
| 5,728,281 A | 3/1998 | Holmstrom et al. |
| 5,730,125 A | 3/1998 | Prutchi et al. |
| 5,741,211 A | 4/1998 | Renirie et al. |
| 5,797,898 A | 8/1998 | Santini et al. |
| 5,830,138 A | 11/1998 | Wilson |
| 5,833,603 A | 11/1998 | Kovacs et al. |
| 5,854,078 A | 12/1998 | Asher |
| 5,871,442 A | 2/1999 | Madarasz et al. |
| 5,902,326 A | 5/1999 | Lessar et al. |
| 5,958,782 A | 9/1999 | Bentsen et al. |
| 5,995,860 A | 11/1999 | Sun et al. |
| 6,002,954 A | 12/1999 | Van Antwerp et al. |
| 6,011,984 A | 1/2000 | Van Antwerp et al. |
| 6,040,194 A | 3/2000 | Chick et al. |
| 6,049,727 A | 4/2000 | Crothall |
| 6,070,093 A | 5/2000 | Oosta et al. |
| 6,097,139 A | 8/2000 | Tuck et al. |
| 6,122,536 A | 9/2000 | Sun et al. |
| 6,123,861 A | 9/2000 | Santini et al. |
| 6,125,290 A | 9/2000 | Miesel |
| 6,125,291 A | 9/2000 | Miesel et al. |
| 6,134,459 A | 10/2000 | Roberts et al. |
| 6,144,866 A | 11/2000 | Miesel et al. |
| 6,163,714 A | 12/2000 | Stanley et al. |
| 6,175,642 B1 | 1/2001 | Gobbi et al. |
| 6,187,599 B1 | 2/2001 | Asher et al. |
| 6,198,952 B1 | 3/2001 | Miesel |
| 6,216,022 B1 | 4/2001 | Tyrrell et al. |
| 6,219,137 B1 | 4/2001 | Vo-Dinh |
| 6,232,130 B1 | 5/2001 | Wolf |
| 6,236,870 B1 | 5/2001 | Madarasz et al. |
| 6,256,522 B1 | 7/2001 | Schultz |
| 6,267,724 B1 | 7/2001 | Taylor et al. |
| 6,268,161 B1 | 7/2001 | Han et al. |
| 6,277,627 B1 | 8/2001 | Hellinga |
| 6,304,766 B1 | 10/2001 | Colvin |
| 6,330,464 B1 | 12/2001 | Colvin et al. |
| 6,343,223 B1 | 1/2002 | Chin et al. |
| 6,344,340 B1 | 2/2002 | Dibner et al. |
| 6,368,274 B1 | 4/2002 | Van Antwerp et al. |
| 6,379,955 B1 | 4/2002 | Kopelman et al. |
| 6,383,767 B1 | 5/2002 | Polak |
| 6,438,397 B1 | 8/2002 | Bosquet et al. |
| 6,442,409 B1 | 8/2002 | Peyman |
| 6,454,710 B1 | 9/2002 | Ballerstadt et al. |
| 6,466,821 B1 | 10/2002 | Pianca et al. |
| 6,491,639 B1 | 12/2002 | Turcott |
| 6,491,666 B1 | 12/2002 | Santini et al. |
| 6,505,059 B1 | 1/2003 | Kollias et al. |
| 6,521,446 B2 | 2/2003 | Hellinga |
| 6,527,762 B1 | 3/2003 | Santini et al. |
| 6,544,800 B2 | 4/2003 | Asher |
| 6,551,838 B2 | 4/2003 | Santini et al. |
| 6,579,690 B1 | 6/2003 | Bonnecaze et al. |
| 6,594,092 B2 | 7/2003 | Von et al. |
| 6,594,510 B2 | 7/2003 | Madarasz et al. |
| 6,602,521 B1 | 8/2003 | Ting et al. |
| 6,625,479 B1 | 9/2003 | Weber et al. |
| 6,666,821 B2 | 12/2003 | Keimel et al. |
| 6,671,527 B2 | 12/2003 | Petersson et al. |
| 6,673,596 B1 | 1/2004 | Sayler et al. |
| 6,682,938 B1 | 1/2004 | Satcher, Jr. et al. |
| 6,694,158 B2 | 2/2004 | Polak |
| 6,711,423 B2 * | 3/2004 | Colvin, Jr. ......... G01N 21/7703 600/316 |
| 6,731,976 B2 | 5/2004 | Penn et al. |
| RE38,525 E | 6/2004 | Stanley et al. |
| 6,766,183 B2 | 7/2004 | Walsh |
| 6,771,993 B2 | 8/2004 | Rule et al. |
| 6,800,451 B2 | 10/2004 | Daniloff et al. |
| 6,804,544 B2 | 10/2004 | Van Antwerp et al. |
| 6,814,490 B1 | 11/2004 | Suhm et al. |
| 6,815,162 B2 | 11/2004 | Boukherroub et al. |
| 6,835,553 B2 | 12/2004 | Han et al. |
| 6,855,556 B2 | 2/2005 | Amiss et al. |
| 6,875,208 B2 | 4/2005 | Santini et al. |
| 6,885,881 B2 | 4/2005 | Leonhardt |
| 6,885,883 B2 | 4/2005 | Parris et al. |
| 6,893,545 B2 | 5/2005 | Gotoh et al. |
| 6,912,078 B2 | 6/2005 | Kudrle et al. |
| 6,918,873 B1 | 7/2005 | Millar et al. |
| 6,928,325 B2 | 8/2005 | Zhu et al. |
| 6,937,900 B1 | 8/2005 | Pianca et al. |
| 6,944,488 B2 | 9/2005 | Roberts |
| 6,952,603 B2 | 10/2005 | Gerber et al. |
| 6,957,094 B2 | 10/2005 | Chance et al. |
| 6,976,982 B2 | 12/2005 | Santini et al. |
| 6,978,182 B2 | 12/2005 | Mazar et al. |
| 7,016,714 B2 | 3/2006 | Colvin et al. |
| 7,039,446 B2 | 5/2006 | Ruchti et al. |
| 7,070,590 B1 | 7/2006 | Santini et al. |
| 7,107,086 B2 | 9/2006 | Reihl et al. |
| 7,133,710 B2 | 11/2006 | Acosta et al. |
| 7,134,999 B2 | 11/2006 | Brauker et al. |
| 7,144,474 B1 | 12/2006 | Hansen et al. |
| 7,157,723 B2 | 1/2007 | Colvin et al. |
| 7,164,948 B2 | 1/2007 | Struble et al. |
| 7,166,871 B2 | 1/2007 | Erchak |
| 7,174,212 B1 | 2/2007 | Klehn et al. |
| 7,181,096 B2 | 2/2007 | Matsumoto et al. |
| 7,201,876 B2 | 4/2007 | Peper et al. |
| 7,225,024 B2 | 5/2007 | Zhu et al. |
| 7,236,821 B2 | 6/2007 | Cates et al. |
| 7,410,616 B2 | 8/2008 | Santini et al. |
| 7,447,533 B1 | 11/2008 | Fang et al. |
| 7,449,246 B2 | 11/2008 | Kim et al. |
| 7,450,980 B2 | 11/2008 | Kawanishi |
| 7,471,290 B2 | 12/2008 | Wang et al. |
| 7,577,470 B2 | 8/2009 | Shah et al. |
| 7,632,234 B2 | 12/2009 | Manda et al. |
| 7,633,356 B2 | 12/2009 | Hamet et al. |
| 7,686,762 B1 | 3/2010 | Najafi et al. |
| 7,761,130 B2 | 7/2010 | Simpson et al. |
| 7,805,174 B2 | 9/2010 | Carpenter et al. |
| 7,809,441 B2 | 10/2010 | Kane et al. |
| 7,829,147 B2 | 11/2010 | Aitken et al. |
| 7,846,095 B2 | 12/2010 | Christopherson et al. |
| 7,890,171 B2 | 2/2011 | Zhu et al. |

(56) References Cited

U.S. PATENT DOCUMENTS

| | | |
|---|---|---|
| 7,894,884 B2 | 2/2011 | Song et al. |
| 7,935,499 B2 | 5/2011 | Dunn et al. |
| 8,126,554 B2 | 2/2012 | Kane et al. |
| 8,131,364 B2 | 3/2012 | Zhu et al. |
| 8,141,489 B2 | 3/2012 | Belanger et al. |
| 8,160,670 B2 | 4/2012 | Ouyang et al. |
| 8,165,840 B2 | 4/2012 | Hatlestad et al. |
| 8,257,067 B2 | 9/2012 | Fukui et al. |
| 8,290,592 B2 | 10/2012 | Michael et al. |
| 8,303,511 B2 | 11/2012 | Eigler et al. |
| 8,378,453 B2 | 2/2013 | Fedorov et al. |
| 8,414,489 B2 | 4/2013 | Shah et al. |
| 8,435,604 B2 | 5/2013 | Aitken et al. |
| 8,527,067 B2 | 9/2013 | De Kock et al. |
| 8,571,659 B2 | 10/2013 | Kane et al. |
| 8,636,884 B2 | 1/2014 | Feldman et al. |
| 8,696,564 B2 | 4/2014 | Chavan et al. |
| 8,710,625 B2 | 4/2014 | Fedorov et al. |
| 8,765,060 B2 | 7/2014 | Buhlmann et al. |
| 8,827,899 B2 | 9/2014 | Farr et al. |
| 9,101,277 B2 | 8/2015 | Doerr |
| 9,320,618 B2 | 4/2016 | Schmitz et al. |
| 9,326,707 B2 | 5/2016 | McGarraugh |
| 9,357,968 B2 | 6/2016 | Hauer et al. |
| 9,399,076 B2 | 7/2016 | Yu et al. |
| 9,693,714 B2 | 7/2017 | Dehennis et al. |
| 9,943,256 B2 | 4/2018 | Varsavsky et al. |
| 10,105,080 B1 | 10/2018 | Kam et al. |
| 10,194,808 B1 | 2/2019 | Thompson et al. |
| 10,543,371 B2 | 1/2020 | Hunt et al. |
| 10,575,765 B2 * | 3/2020 | Brill .................... A61B 5/14532 |
| 10,667,745 B2 | 6/2020 | Anker et al. |
| 10,716,500 B2 | 7/2020 | Stahmann |
| 10,743,115 B2 | 8/2020 | Frederiksen et al. |
| 10,952,621 B2 | 3/2021 | Kane et al. |
| 11,089,983 B2 | 8/2021 | Li et al. |
| 11,129,557 B2 | 9/2021 | Li et al. |
| 11,439,304 B2 | 9/2022 | Stahmann et al. |
| 11,571,151 B2 | 2/2023 | Kane et al. |
| 12,004,853 B2 | 6/2024 | Stahmann et al. |
| 2002/0016535 A1 | 2/2002 | Martin et al. |
| 2002/0026108 A1 | 2/2002 | Colvin |
| 2002/0033260 A1 | 3/2002 | Lungwitz et al. |
| 2002/0033454 A1 | 3/2002 | Cheng et al. |
| 2002/0035317 A1 | 3/2002 | Cheng et al. |
| 2002/0095075 A1 | 7/2002 | Madarasz et al. |
| 2002/0127626 A1 | 9/2002 | Daniloff et al. |
| 2002/0151812 A1 | 10/2002 | Scheiner et al. |
| 2003/0100040 A1 | 5/2003 | Bonnecaze et al. |
| 2003/0100822 A1 | 5/2003 | Lew et al. |
| 2003/0114735 A1 | 6/2003 | Silver et al. |
| 2003/0191376 A1 | 10/2003 | Samuels et al. |
| 2003/0208113 A1 | 11/2003 | Mault et al. |
| 2004/0023317 A1 | 2/2004 | Motamedi et al. |
| 2004/0030365 A1 | 2/2004 | Rubin |
| 2004/0059206 A1 | 3/2004 | Braig et al. |
| 2004/0073100 A1 | 4/2004 | Ballerstadt et al. |
| 2004/0087842 A1 | 5/2004 | Lakowicz et al. |
| 2004/0100376 A1 | 5/2004 | Lye et al. |
| 2004/0106953 A1 | 6/2004 | Yomtov et al. |
| 2004/0132172 A1 | 7/2004 | Cunningham et al. |
| 2004/0133079 A1 | 7/2004 | Mazar et al. |
| 2004/0147034 A1 | 7/2004 | Gore et al. |
| 2004/0157341 A1 | 8/2004 | Reynolds et al. |
| 2004/0161853 A1 | 8/2004 | Yang et al. |
| 2004/0176669 A1 | 9/2004 | Colvin, Jr. |
| 2004/0176672 A1 | 9/2004 | Silver et al. |
| 2004/0180379 A1 | 9/2004 | Van Duyne et al. |
| 2004/0180391 A1 | 9/2004 | Gratzl et al. |
| 2004/0186359 A1 | 9/2004 | Beaudoin et al. |
| 2004/0191119 A1 | 9/2004 | Zanzucchi et al. |
| 2004/0199062 A1 | 10/2004 | Petersson et al. |
| 2004/0206916 A1 | 10/2004 | Colvin, Jr. et al. |
| 2004/0215134 A1 | 10/2004 | Soykan et al. |
| 2004/0249311 A1 | 12/2004 | Haar et al. |
| 2004/0254438 A1 | 12/2004 | Chuck et al. |
| 2004/0260162 A1 | 12/2004 | Rohleder et al. |
| 2005/0027176 A1 | 2/2005 | Xie |
| 2005/0033133 A1 | 2/2005 | Kraft |
| 2005/0038329 A1 | 2/2005 | Morris et al. |
| 2005/0042704 A1 | 2/2005 | Alarcon et al. |
| 2005/0043894 A1 | 2/2005 | Fernandez |
| 2005/0051427 A1 | 3/2005 | Brauker et al. |
| 2005/0065464 A1 | 3/2005 | Talbot et al. |
| 2005/0065556 A1 | 3/2005 | Reghabi et al. |
| 2005/0069925 A1 * | 3/2005 | Ford .................... A61B 5/4266 702/20 |
| 2005/0070768 A1 | 3/2005 | Zhu et al. |
| 2005/0070770 A1 | 3/2005 | Dirac et al. |
| 2005/0070771 A1 | 3/2005 | Rule et al. |
| 2005/0096587 A1 | 5/2005 | Santini et al. |
| 2005/0107677 A1 | 5/2005 | Ward et al. |
| 2005/0113657 A1 | 5/2005 | Alarcon et al. |
| 2005/0113658 A1 | 5/2005 | Jacobson et al. |
| 2005/0130249 A1 | 6/2005 | Parris et al. |
| 2005/0137481 A1 | 6/2005 | Sheard et al. |
| 2005/0148832 A1 | 7/2005 | Reghabi et al. |
| 2005/0149139 A1 | 7/2005 | Plicchi et al. |
| 2005/0154272 A1 | 7/2005 | Dirac et al. |
| 2005/0173316 A1 | 8/2005 | Pleus |
| 2005/0221276 A1 | 10/2005 | Rozakis et al. |
| 2005/0221277 A1 | 10/2005 | Kawanishi |
| 2005/0228226 A1 | 10/2005 | Muckner |
| 2006/0025748 A1 | 2/2006 | Ye |
| 2006/0076236 A1 | 4/2006 | Shah et al. |
| 2006/0217771 A1 | 9/2006 | Soykan et al. |
| 2006/0229694 A1 | 10/2006 | Schulman et al. |
| 2006/0253043 A1 | 11/2006 | Zhang et al. |
| 2006/0270923 A1 | 11/2006 | Brauker et al. |
| 2007/0027495 A1 | 2/2007 | Gerber |
| 2007/0118056 A1 | 5/2007 | Wang et al. |
| 2007/0156194 A1 | 7/2007 | Wang |
| 2007/0219628 A1 | 9/2007 | Shanley et al. |
| 2007/0252713 A1 | 11/2007 | Rondoni et al. |
| 2007/0270674 A1 | 11/2007 | Kane et al. |
| 2007/0270675 A1 * | 11/2007 | Kane .................... A61N 1/3962 600/315 |
| 2007/0275035 A1 | 11/2007 | Herman et al. |
| 2008/0033260 A1 | 2/2008 | Sheppard et al. |
| 2008/0046080 A1 | 2/2008 | Vanden et al. |
| 2008/0077190 A1 | 3/2008 | Kane |
| 2008/0082001 A1 | 4/2008 | Hatlestad et al. |
| 2008/0086177 A1 | 4/2008 | Min et al. |
| 2008/0152283 A1 | 6/2008 | Nielsen et al. |
| 2008/0293997 A1 | 11/2008 | Buhlmann et al. |
| 2008/0294047 A1 | 11/2008 | Kodama et al. |
| 2008/0294209 A1 | 11/2008 | Thompson et al. |
| 2009/0018425 A1 | 1/2009 | Ouyang et al. |
| 2009/0024045 A1 | 1/2009 | Prakash et al. |
| 2009/0076353 A1 | 3/2009 | Carpenter et al. |
| 2009/0124875 A1 | 5/2009 | Bentsen et al. |
| 2009/0156920 A1 | 6/2009 | Kotzan et al. |
| 2009/0221885 A1 | 9/2009 | Hall et al. |
| 2009/0259407 A1 * | 10/2009 | Gerlitz ............... A61B 5/14532 702/19 |
| 2009/0312973 A1 | 12/2009 | Hatlestad et al. |
| 2010/0057057 A1 | 3/2010 | Hayter et al. |
| 2010/0119760 A1 | 5/2010 | Kirk et al. |
| 2010/0149544 A1 | 6/2010 | Ghislain |
| 2010/0202966 A1 | 8/2010 | Gross et al. |
| 2010/0280578 A1 | 11/2010 | Skelton et al. |
| 2010/0292634 A1 | 11/2010 | Bilmes et al. |
| 2011/0024307 A1 | 2/2011 | Simpson et al. |
| 2011/0098547 A1 | 4/2011 | Zhu et al. |
| 2011/0130666 A1 | 6/2011 | Dong et al. |
| 2012/0029328 A1 | 2/2012 | Shimizu et al. |
| 2012/0059232 A1 | 3/2012 | Gross et al. |
| 2012/0116195 A1 | 5/2012 | Chaum et al. |
| 2013/0060105 A1 | 3/2013 | Shah et al. |
| 2013/0150689 A1 | 6/2013 | Shaw-Klein |
| 2013/0184599 A1 | 7/2013 | Friedman et al. |
| 2013/0197332 A1 | 8/2013 | Lucisano et al. |
| 2013/0338727 A1 | 12/2013 | Mokelke et al. |
| 2014/0018644 A1 | 1/2014 | Colvin et al. |

(56) References Cited

U.S. PATENT DOCUMENTS

| | | | |
|---|---|---|---|
| 2014/0046152 A1* | 2/2014 | Bechtel | A61B 5/14552 600/323 |
| 2014/0091945 A1 | 4/2014 | Rivas et al. | |
| 2014/0155710 A1 | 6/2014 | Rowland et al. | |
| 2014/0187878 A1 | 7/2014 | Emken et al. | |
| 2014/0276164 A1 | 9/2014 | Thakur et al. | |
| 2014/0286875 A1 | 9/2014 | Gamsey et al. | |
| 2014/0357964 A1 | 12/2014 | Wisniewski et al. | |
| 2014/0364758 A1 | 12/2014 | Schindhelm et al. | |
| 2015/0057509 A1 | 2/2015 | Huffstetler et al. | |
| 2015/0164383 A1 | 6/2015 | Varsavsky et al. | |
| 2015/0173655 A1 | 6/2015 | Demmer et al. | |
| 2015/0352229 A1 | 12/2015 | Brill et al. | |
| 2016/0256063 A1 | 9/2016 | Friedman et al. | |
| 2016/0363550 A1 | 12/2016 | Koo et al. | |
| 2016/0374597 A1 | 12/2016 | Stahmann | |
| 2017/0000359 A1 | 1/2017 | Kohli et al. | |
| 2017/0215732 A1 | 8/2017 | Genier et al. | |
| 2017/0245788 A1 | 8/2017 | Heikenfeld | |
| 2018/0055426 A1 | 3/2018 | Kane et al. | |
| 2018/0153451 A1 | 6/2018 | Heikenfeld et al. | |
| 2018/0263511 A1 | 9/2018 | Burnes et al. | |
| 2018/0344218 A1 | 12/2018 | Li et al. | |
| 2018/0350468 A1 | 12/2018 | Friedman et al. | |
| 2018/0364207 A1 | 12/2018 | Roberts et al. | |
| 2019/0029567 A1 | 1/2019 | Stahmann et al. | |
| 2019/0038190 A1 | 2/2019 | Zhong et al. | |
| 2019/0046032 A1 | 2/2019 | Stahmann et al. | |
| 2019/0059792 A1 | 2/2019 | Kane et al. | |
| 2019/0125228 A1 | 5/2019 | Kane et al. | |
| 2019/0167112 A1 | 6/2019 | Kane et al. | |
| 2019/0167162 A1 | 6/2019 | Li et al. | |
| 2019/0336050 A1 | 11/2019 | Deck et al. | |
| 2020/0029904 A1* | 1/2020 | Kim | A61B 5/6801 |
| 2020/0061271 A1 | 2/2020 | Potkay | |
| 2020/0069949 A1 | 3/2020 | Ghosh | |
| 2021/0093235 A1* | 4/2021 | DeSousa | A61B 5/1451 |
| 2021/0228119 A1 | 7/2021 | Ng et al. | |
| 2021/0401564 A1 | 12/2021 | Neuenfeldt et al. | |
| 2022/0133177 A1 | 5/2022 | Li et al. | |
| 2022/0133178 A1 | 5/2022 | Li et al. | |
| 2022/0409100 A1 | 12/2022 | Sipple et al. | |
| 2024/0268718 A1 | 8/2024 | Kane et al. | |
| 2024/0415417 A1 | 12/2024 | Li et al. | |
| 2024/0415418 A1 | 12/2024 | Li et al. | |

FOREIGN PATENT DOCUMENTS

| | | |
|---|---|---|
| CN | 109419515 | 3/2019 |
| CN | 109717876 | 5/2019 |
| CN | 109864746 | 6/2019 |
| CN | 109864747 | 6/2019 |
| EP | 2967333 | 1/2016 |
| EP | 3492014 | 6/2019 |
| EP | 3495804 | 6/2019 |
| EP | 3672486 | 7/2020 |
| EP | 3409203 | 4/2021 |
| EP | 3440999 | 3/2023 |
| JP | 2005287762 | 10/2005 |
| JP | 2005315871 | 11/2005 |
| JP | 2006507078 | 3/2006 |
| JP | 2006126715 | 5/2006 |
| JP | 2007525858 | 9/2007 |
| JP | 2009537247 | 10/2009 |
| WO | 9625978 | 8/1996 |
| WO | 9719188 | 5/1997 |
| WO | 9801071 | 1/1998 |
| WO | 9902651 | 1/1999 |
| WO | 0018289 | 4/2000 |
| WO | 0025862 | 5/2000 |
| WO | 0025863 | 5/2000 |
| WO | 0180728 | 11/2001 |
| WO | 2004039265 | 5/2004 |
| WO | 2004071291 | 8/2004 |
| WO | 2004081522 | 9/2004 |
| WO | 2004091719 | 10/2004 |
| WO | 2004092713 | 10/2004 |
| WO | 2005074612 | 8/2005 |
| WO | 2006017169 | 2/2006 |
| WO | 2007110867 | 10/2007 |
| WO | 2007137037 | 11/2007 |
| WO | 2008076491 | 6/2008 |
| WO | 2009038996 | 3/2009 |
| WO | 2013016573 | 1/2013 |
| WO | 2015048514 | 4/2015 |
| WO | 2019023093 | 1/2019 |
| WO | 2019040635 | 2/2019 |

OTHER PUBLICATIONS

"First Office Action," for Chinese Patent Application No. 201710681567.3 mailed Mar. 18, 2022 (16 pages) with English Translation.

"First Office Action," for Chinese Patent Application No. 201710730979.1 mailed Apr. 11, 2022 (23 pages) with English Translation.

"International Search Report and Written Opinion," for PCT Application No. PCT/US2021/056590 mailed May 3, 2022 (14 pages).

"Non-Final Office Action," for U.S. Appl. No. 16/041,923 mailed May 23, 2022 (22 pages).

"Non-Final Office Action," for U.S. Appl. No. 16/130,638 mailed May 6, 2022 (13 pages).

"Notice of Allowance," for U.S. Appl. No. 16/038,737 mailed May 18, 2022 (13 pages).

"Response to Final Rejection," mailed Jan. 26, 2022 and the Advisory Action mailed on Apr. 18, 2022 for U.S. Appl. No. 16/130,638, submitted via EFS-Web on Apr. 26, 2022, 7 pages.

"Response to Final Rejection," mailed on Dec. 2, 2021 and the Advisory Action mailed on Apr. 5, 2022 for U.S. Appl. No. 16/106,623, submitted via EFS-Web on May 2, 2022, 14 pages.

"Response to Non-Final Rejection," mailed on Mar. 3, 2022 for U.S. Appl. No. 16/038,737, submitted via EFS-Web on May 4, 2022, 10 pages.

"First Office Action," for Chinese Patent Application No. 201710400287.0 mailed Dec. 23, 2021 (37 pages) with English Translation.

"First Office Action," for Chinese Patent Application No. 201711249985.1 mailed Feb. 27, 2023 (11 pages), with English translation.

"International Preliminary Report on Patentability," for PCT Application No. PCT/US2021/056590 mailed May 11, 2023 (9 pages).

"International Preliminary Report on Patentability," for PCT Application No. PCT/US2021/056602 mailed May 11, 2023 (8 pages).

"Non-Final Office Action," for U.S. Appl. No. 16/041,923 mailed Mar. 29, 2023 (25 pages).

"Non-Final Office Action," for U.S. Appl. No. 16/130,638 mailed May 18, 2023 (13 pages).

"Non-Final Office Action," for U.S. Appl. No. 17/510,802 mailed Jun. 1, 2023 (52 pages).

"Response to Communication Pursuant to Article 94(3) EPC," for European Patent Application No. 18202201.2 filed Mar. 17, 2023 (33 pages).

"Response to Final Rejection," mailed on Nov. 2, 2022 and the Advisory Action mailed on Mar. 17, 2023 for U.S. Appl. No. 16/130,638, submitted via EFS-Web on Apr. 3, 2023, 9 pages.

"Response to Non-Final Rejection," mailed on Mar. 29, 2023, for U.S. Appl. No. 16/041,923, submitted via EFS-Web on Jun. 29, 2023, 14 pages.

"Second Office Action," for Chinese Patent Application No. 201711052948.1 mailed May 17, 2023 (11 pages) with English translation.

Renoe, Brian W., et al. "Influence of Posture on Free Calcium and Related Variables," Clinical Chemistry, vol. 25, Issue 10, Oct. 1, 1979, 1766-1769 (5 pages).

"Communication Pursuant to Article 94(3) EPC," for European Patent Application No. 18202201.2 mailed Nov. 9, 2022 (6 pages).

(56) References Cited

OTHER PUBLICATIONS

"Final Office Action," for U.S. Appl. No. 16/130,638 mailed Nov. 2, 2022 (12 pages).
"First Office Action," for Chinese Patent Application No. 201711052948.1 mailed Oct. 28, 2022 (21 pages) with English Translation.
"First Office Action," for Chinese Patent Application No. 201711266579.6 mailed Jan. 5, 2023 (10 pages) No English Translation.
"Response to Final Office Action," for U.S. Appl. No. 16/041,923, filed on Jan. 20, 2021 (9 pages).
"Response to Final Rejection," mailed on Nov. 2, 2022 for U.S. Appl. No. 16/130,638, submitted via EFS-Web on Feb. 1, 2023, 8 pages.
"Final Office Action," for U.S. Appl. No. 16/130,638 mailed Jan. 26, 2022 (16 pages).
"International Search Report and Written Opinion," for PCT Application No. PCT/US2021/056602 mailed Feb. 9, 2022 (12 pages).
"Invitation to Pay Additional Fees," for PCT Application No. PCT/US2021/056590 mailed Mar. 9, 2022 (9 pages).
"Non-Final Office Action," for U.S. Appl. No. 16/038,737 mailed Mar. 3, 2022 (17 pages).
"Response to Final Rejection," mailed Jan. 26, 2022 for U.S. Appl. No. 16/130,638, submitted via EFS-Web on Mar. 24, 2022, 8 pages.
"Response to Final Rejection," mailed on Dec. 2, 2021 for U.S. Appl. No. 16/106,623, submitted via EFS-Web on Feb. 24, 2022, 14 pages.
"Response to Non-Final Rejection," mailed on Nov. 15, 2021 for U.S. Appl. No. 16/041,923, submitted via EFS-Web on Feb. 9, 2022, 7 pages.
"Communication Pursuant to Article 94(3) EPC," for European Patent Application No. 07762189.4 mailed Mar. 24, 2009 (3 pages).
"Communication pursuant to Article 94(3) EPC," for European Patent Application No. 07762189.4 mailed Mar. 16, 2010 (3 pages).
File History for U.S. Appl. No. 11/856,850 downloaded Dec. 7, 2021 (146 pages).
File History for U.S. Appl. No. 12/391,761 downloaded Dec. 7, 2021 (285 pages).
File History for European Patent Application No. 18174561.3 downloaded Dec. 7, 2021 (230 pages).
File History for U.S. Appl. No. 15/992,823 downloaded Dec. 7, 2021 (467 pages).
File History for U.S. Appl. No. 16/041,923 downloaded Dec. 7, 2021 (437 pages).
File History for European Patent Application No. 18188253.1 downloaded Dec. 7, 2021 (187 pages).
File History for U.S. Appl. No. 16/038,737 downloaded Dec. 7, 2021 (371 pages).
File History for European Patent Application No. 18773017.1 downloaded Dec. 7, 2021 (276 pages).
File History for U.S. Appl. No. 16/106,623 downloaded Dec. 7, 2021 (480 pages).
File History for European Patent Application No. 18202201.2 downloaded Dec. 7, 2021 (188 pages).
File History for U.S. Appl. No. 16/130,638 downloaded Dec. 7, 2021 (266 pages).
File History for European Patent Application No. 18207668.7 downloaded Dec. 7, 2021 (367 pages).
File History for U.S. Appl. No. 16/136,875 downloaded Dec. 7, 2021 (338 pages).
File History for European Patent Application No. 18209525.7 downloaded Dec. 7, 2021 (335 pages).
File History for U.S. Appl. No. 16/136,773 downloaded Dec. 7, 2021 (244 pages).
"First Examination Report," for Australian Patent Application No. 2008302499 mailed Feb. 8, 2011 (1 page).
"International Preliminary Report on Patentability," for PCT Application No. PCT/US2008/075673 mailed Mar. 24, 2010 (6 pages).
"International Preliminary Report on Patentability," for PCT Application No. PCT/US2018/043225 mailed Feb. 6, 2020 (7 pages).
"International Preliminary Report on Patentability," for PCT Application No. PCT/US2018/047549 mailed Mar. 5, 2020 (11 pages).
"International Search Report and Written Opinion," for PCT Application No. PCT/US2008/075673 mailed Nov. 28, 2008 (13 pages).
"International Search Report and Written Opinion," for PCT Application No. PCT/US2018/043225 mailed Nov. 16, 2018 (11 pages).
"International Search Report and Written Opinion," for PCT Application No. PCT/US2018/047549 mailed Oct. 26, 2018 (15 pages).
"Microminiature Device Monitors Vital Electrolytes and Metabolites," John Glenn Biomedical Engineering Consortium, May 2002 (2 pages).
"Microminiature Monitor for Vital Electrolyte and Metabolite Levels of Astronauts—Status Report," John Glenn Biomedical Engineering Consortium NASA Glenn Research Center at Lewis Field, Apr. 2003 (5 pages).
"Office Action," for Japanese Patent Application No. 2010-524940 mailed Nov. 22, 2011 (8 pages) with English translation.
"PCT International Search Report and Written Opinion," for International Application No. PCT/US2007/068954, mailed Nov. 17, 2008 (12 pages).
"Response to Communication Pursuant to Article 94(3) EPC," for European Patent Application No. 07762189.4 filed with the EPO Jul. 27, 2009 (8 pages).
"Upconverting nanoparticles," Wikipeda.com accessed Jun. 12, 2017 (13 pages).
Anderson, J. M., et al. "Monocyte, Macrophage and foreign body giant cell interactions with molecularly engineered surfaces," Journal of Materials Science: Materials in Medicine 10 (1999) 579-588 (10 pages).
Anderson, James M. "Biological Responses to Materials," Annu. Rev. Mater. Res. 2001. 31:81-110 (30 pages).
Anderson, James M., et al. "Foreign Body Reaction to Biomaterials," Semin. Immunol. Apr. 2008; 20(2): 86-100 (27 pages).
Bakker, Eric, et al. "Carrier-Based Ion-Selective Electrodes and Bulk Optodes. 1. General Characteristics," Chem. Rev. 1997, 97, 3083-3132 (50 pages).
Benco, John S., et al. "Optical Sensors for Blood Analytes," The Spectrum, vol. 14, Issue 4, pp. 4-11, Winter 2001 (8 pages).
Bender, J. W., et al. "The Use of Biomedical Sensors to Monitor Capsule Formation Around Soft Tissue Implants," Annals of Plastic Surgery, vol. 56, No. 1, Jan. 2006, pp. 72-77 (6 pages).
Bridges, Amanda W., et al. "Anti-Inflammatory Polymeric Coatings for Implantable Biomaterials and Devices," Journal of Diabetes Science and Technology 2008;2(6):984-994 (11 pages).
Buhlmann, Philippe, et al. "Carrier-Based Ion-Selective Electrodes and Bulk Optodes. 2. Ionophores for Potentiometric and Optical Sensors," Chem. Rev. 1998, 98, 1593-1687 (95 pages).
Han, In Suk, et al. "Constant-Volume Hydrogel Osmometer: A New Device Concept for Miniature Biosensors," Biomacromolecules, 3 2002, pp. 1271-1275 (5 pages).
He, Huarui, et al. "Enantioselective Optodes," Analytica Chimica Acta, 246, pp. 251-257, 1991 (7 pages).
He, Wei, et al. "A Novel Anti-inflammatory Surface for Neural Electrodes," Adv. Mater. 2007, 19, 3529-3533 (5 pages).
Helton, Kristen L., et al. "Biomechanics of the Sensor-Tissue Interface-Effects of Motion, Pressure, and Design on Sensor Performance and the Foreign Body Response—Part I: Theoretical Framework," Journal of Diabetes Science and Technology 2011;5(3):632-646 (15 pages).
Koh, Ahyeon, et al. "Glucose Sensor Membranes for Mitigating the Foreign Body Response," Journal of Diabetes Science and Technology 2011;5(5):1052-1059 (8 pages).
Koronczi, et al. "Development of a submicron optochemical potassium sensor with enhanced stability due to internal reference," Sensors and Actuators B, 51:188-195 (1998).
Kuwana, Eddy, et al. "Sensing of pH in Multiply Scattering Media with Fluorescence Lifetime," Advanced Biomedical and Clinical Diagnostic Systems, Proceedings of SPIE, vol. 4958, pp. 32-42, 2003 (11 pages).
Lehn, J. M., et al."[2]-Cryptates: Stability and Selectivity of Alkali and Akaline-Earth Macrobicycle Complexes," Journal of the American Chemical Society, Nov. 12, 1975 pp. 6700-6707 (8 pages).

(56) References Cited

OTHER PUBLICATIONS

Lima-Oliveira, Gabriel, et al. "Patient Posture for Blood Collection by Venipuncture: Recall for Standardization After 28 Years," Brazilian Journal of Hematology and Hemotherapy 2017 <http://dx.doi.org/10.1016/j.bjhh.2017.01.004> (6 pages).

Messler "The Joining of Materials," Nov. 2004 (58 pages).

Novak, Matthew T., et al. "Modeling the relative impact of capsular tissue effects on implanted glucose sensor time lag and signal attenuation," Anal. Bioanal. Chem. Oct. 2010; 398(4):1695-1705 (22 pages).

Padmanabhan, Jagnnath, et al. "Nanomaterials, Inflammation and Tissue Engineering," Wiley Interdiscip Rev Nanomed Nanobiotechnol. May 2015; 7(3):355-370 (23 pages).

Roger, Yvonne, et al. "Grid-like surface structures in thermoplastic polyurethane induce anti-inflammatory and anti-fibrotic processes in bone marrow-derived mesenchymal stem cells," Abstract Only Colloids and Surfaces B: Biointerfaces vol. 148, Dec. 2016, pp. 104-115 (4 pages).

Seelig, Mildred S. "Electrographic Patterns of Magnesium Depletion Appearing in Alcoholic Heart Disease," Annals of the New York Academy of Sciences, vol. 162, Article 2, 1969, pp. 906-917 (13 pages).

Sharkawy, A. Adam, et al. "Engineering the tissue which encapsulates subcutaneous implants. I. Diffusion properties," Department of Biomedical Engineering, NSF Center for Emerging Cardiovascular Technology, Duke University, Durham, North Carolina 1996 (12 pages).

Shirreffs, S. M. "The Effect of Posture Change on Blood Volume Serum Potassium, and Whole Body Electrical Impedance," Eur. J. Appl. Physiol. (1994)69:461-463 (3 pages).

Tohda, Koji, et al. "A Microscopic, Continuous, Optical Monitor for Interstitial Electrolytes and Glucose," Chemphyschem 2003, pp. 155-160 (6 pages).

Tohda, Koji, et al. "Micro-miniature Autonomous Optical Sensor Array for Monitoring Ions and Metabolites 1: Design, Fabrication, and Data Analysis," Analytical Sciences, Mar. 2006, vol. 22 pp. 383-388 (6 pages).

Weisberg, Lawrence S. "Management of Severe Hyperkalemia," Crit Care Med 2008 Vol. 36, No. 12 (6 pages).

"Final Office Action," for U.S. Appl. No. 16/041,923 mailed Oct. 21, 2022 (31 pages).

"Non-Final Office Action," for U.S. Appl. No. 16/106,623 mailed Jun. 24, 2022 (19 pages).

"Notice of Allowance," for U.S. Appl. No. 16/106,623 mailed Oct. 13, 2022 (11 pages).

"Response to Non-Final Rejection," mailed on Jun. 24, 2022 for U.S. Appl. No. 16/106,623, submitted via EFS-Web on Sep. 22, 2022, 7 pages.

"Response to Non-Final Rejection," mailed on May 23, 2022 for U.S. Appl. No. 16/041,923, submitted via EFS-Web on Aug. 23, 2022, 11 pages.

"Response to Non-Final Rejection," mailed on May 6, 2022 for U.S. Appl. No. 16/130,638, submitted via EFS-Web on Aug. 5, 2022, 7 pages.

"Second Office Action," for Chinese Patent Application No. 201710730979.1 mailed Oct. 21, 2022 (3 pages) No English Translation.

"Final Office Action," for U.S. Appl. No. 16/041,923 mailed Oct. 16, 2023 (28 pages).

"Final Office Action," for U.S. Appl. No. 17/510,802 mailed Oct. 5, 2023 (13 pages).

"Response to Non-Final Rejection," mailed on Jun. 1, 2023, for U.S. Appl. No. 17/510,802, submitted via EFS-Web on Aug. 31, 2023, 9 pages.

"Response to Non-Final Rejection, " mailed on May 18, 2023, for U.S. Appl. No. 16/130,638, submitted via EFS-Web on Aug. 17, 2023, 12 pages.

Bansal, Vinod K. "Serum Inorganic Phosphorus," In: Walker HK, Hall WD, Hurst JW, editors. Clinical Methods: The History, Physical, and Laboratory Examinations. 3rd ed. (1990) Boston: Butterworths; 1990. Chapter 198. PMID 21250152 (6 pages).

Statland, Bernard E., et al. "Factors Contributing to Intra-Individual Variation of Serum Constituents: 4. Effects of Posture and Tourniquet Application on Variation of Serum Constituents in Healthy Subjects," Clinical Chemistry, 20(12), 1513-1519 (1974), doi.org/10/1093/clinchem/20.12.1513 (7 pages).

"Final Office Action," for U.S. Appl. No. 16/130,638 mailed Oct. 31, 2023 (18 pages).

"Notice of Allowance," for U.S. Appl. No. 16/041,923 mailed Feb. 14, 2024 (13 pages).

"Response to Communication Pursuant to Rules 161(1) and 162 EPC," for EP Patent Application No. 21823395.5 mailed Dec. 4, 2023 (13 pages).

"Response to Communication Pursuant to Rules 161(1) and 162 EPC," for European Patent Application No. 21823397.1 filed Dec. 6, 2023 (12 pages).

"Response to Final Rejection," mailed on Oct. 16, 2023, for U.S. Appl. No. 16/041,923, submitted via EFS-Web on Jan. 16, 2024, 5 pages.

"Response to Final Rejection," mailed on Oct. 5, 2023, and the Advisory Action mailed on Jan. 17, 2024, in U.S. Appl. No. 17/510,802, submitted via EFS-Web on Jan. 29, 2024, 10 pages.

"Response to Final Rejection," mailed on Oct. 5, 2023, for U.S. Appl. No. 17/510,802, submitted via EFS-Web on Jan. 4, 2024, 10 pages.

"Non-Final Office Action," for U.S. Appl. No. 17/510,802 mailed Apr. 24, 2024 (26 pages).

"File History," for related U.S. Appl. No. 15/992,823, filed May 30, 2018, 450 pages. (Downloaded Aug. 13, 2024.).

"File History," for related U.S. Appl. No. 16/038,737, filed Jul. 18, 2018, 483 pages. (Downloaded Aug. 13, 2024.).

"File History," for related U.S. Appl. No. 16/041,923, filed Jul. 23, 2018, 638 pages. (Downloaded Aug. 13, 2024.).

"File History," for related U.S. Appl. No. 16/106,623, filed Aug. 21, 2018, 457 pages. (Downloaded Aug. 13, 2024.).

"File History," for related U.S. Appl. No. 16/130,638, filed Sep. 13, 2018, 486 pages. (Downloaded Aug. 13, 2024.).

"File History," for related U.S. Appl. No. 16/136,773, filed Sep. 20, 2018, 235 pages. (Downloaded Aug. 13, 2024.).

"File History," for related U.S. Appl. No. 17/510,802, filed Oct. 26, 2021, 395 pages. (Downloaded Aug. 13, 2024.).

"File History," for related U.S. Appl. No. 16/136,875, filed Sep. 20, 2018, 328 pages. (Downloaded Aug. 13, 2024.).

"Response to Non-Final Rejection," mailed on Apr. 24, 2024, for U.S. Appl. No. 17/510,802, submitted via EFS-Web on Jul. 24, 2024, 11 pages.

Kim, Yeu-Chun, et al. "Microneedles for drug and vaccine delivery," Advanced Drug Delivery Reviews 64 (2012) 1547-1568 (22 pages).

Martanto, W., et al. "Side-Opening Hollow Microneedles for Transdermal Drug Delivery," Georgia Institute of Technology, Atlanta, GA, School of Chemical and Biomolecular Engineering, School of Electrical and Computer Engineering, 2006 (3 pages).

Tsai, Hc, et al. "Simultaneous Determination of Renal Clinical Analytes in Serum using Hydrolase- and Oxidase-Encapsulated Optical Array Biosensors," Analytical Biochemistry 334 (2004) 183-192 (10 pages).

Voskerician, Gabriela, et al. "Biocompatibility and Biofouling of MEMs Drug Delivery Devices," Biomaterials 24 (2003) 1959-1967 (9 pages).

"Final Office Action," for U.S. Appl. No. 18/797,900 mailed Feb. 5, 2025 (30 pages).

"Non-Final Office Action," for U.S. Appl. No. 17/510,806 mailed Feb. 11, 2025 (64 pages).

"Non-Final Office Action," for U.S. Appl. No. 18/797,900 mailed Oct. 28, 2024 (49 pages).

"Response to Final Rejection," mailed on Sep. 12, 2024, for U.S. Appl. No. 17/510,802, submitted via EFS-Web on Dec. 11, 2024, 12 pages.

(56) References Cited

OTHER PUBLICATIONS

"Response to Non-Final Rejection," mailed on Oct. 28, 2024, for U.S. Appl. No. 18/797,900, submtted via Patent Center on Jan. 28, 2025, 14 pages.

Nacht, Barbara, et al."Integrated catheter system for continuous glucose measurement and simultaneous insulin infusion," Biosensors and Bioelectronics. 2015: 64; 102-110 (Year: 2015).

Susanto, Heru, et al. "Photografted Thin Polymer Hydrogel Layers on PES Ultrafiltration Membranes: Characterization, Stability, and Influence on Separation Performance.," Langmuir. 2007; 23: 7818-7830 (Year: 2007).

"Filter," www.Dictionary.com, 5 pages, printed on Aug. 28, 2025 (Year: 2025).

"Final Office Action," for U.S. Appl. No. 17/510,806 mailed Aug. 28, 2025 (18 pages).

"Final Office Action," for U.S. Appl. No. 18/797,900 mailed Sep. 3, 2025 (35 pages).

"Response to Non-Final Rejection," mailed on May 22, 2025, for U.S. Appl. No. 18/797,900), submitted via Patent Center on Aug. 22, 2025, 14 pages.

"Response to Non-Final Rejection," mailed on Apr. 29, 2025, for U.S. Appl. No. 17/510,802, submitted via Patent Center on Jul. 29, 2025, 11 pages.

"Non-Final Office Action," for U.S. Appl. No. 17/510,802 mailed Apr. 29, 2025 (21 pages).

"Response to Final Rejection," mailed on Feb. 5, 2025, for U.S. Appl. No. 18/797,900, submitted via Patent Center on May 2, 2025, 12 pages.

"Response to Non-Final Rejection," mailed on Feb. 11, 2025, for U.S. Appl. No. 17/510,806, submitted via Patent Center on May 9, 2025, 12 pages.

"Final Office Action," for U.S. Appl. No. 17/510,802 mailed Nov. 6, 2025 (22 pages).

"Non-Final Office Action," for U.S. Appl. No. 17/510,806 mailed Dec. 23, 2025 (26 pages).

"Response to Final Rejection," mailed on Aug. 28, 2025, for U.S. Appl. No. 17/510,806, submitted via Patent Center on Nov. 21, 2025, 10 pages.

"Response to Final Rejection," mailed on Sep. 3, 2025, for U.S. Appl. No. 18/797,900, submitted via Patent Center on Dec. 3, 2025, 13 pages.

\* cited by examiner

INTEGRATED THERMO-PHOTONIC CHEMICAL SENSOR

This application claims the benefit of U.S. Provisional Application No. 63/107,343, filed Oct. 29, 2020, the content of which is herein incorporated by reference in its entirety.

FIELD

Embodiments herein relate to integrated thermo-photonic chemical sensors. More specifically, embodiments herein relate to integrated thermo-photonic chemical sensors as part of an implantable sensing device.

BACKGROUND

Blood chemistry data can provide useful information to physicians treating a variety of medical disorders. By the monitoring of analyte values in the blood of a patient, physicians can make assessments on the effectiveness of a treatment, or the progression or remission of a disease. The measurement of analyte values in the blood can be performed during office visits by drawing the blood of a patient and quantitating analyte concentrations using laboratory techniques in vitro. Concentration values for various blood analytes can yield useful data that can provide important guidance in the treatment and management of both chronic and acute diseases.

In various instances the ability to monitor blood analytes in vivo would be of great importance to the clinical treatment strategy and could benefit the quality of life of a patient in the long term.

SUMMARY

Embodiments herein relate to integrated thermo-photonic chemical sensors as part of an implantable sensing device. In a first aspect, an implantable sensing device is included having a sensing element, an optical excitation assembly configured to illuminate the sensing element, an optical detection assembly configured to receive optical signals from the sensing element, and a control circuit, wherein the control circuit is configured to receive signals from the optical detection assembly, receive signals reflecting temperature, and process signals from the optical detection assembly while adjusting for the signals reflecting temperature.

In a second aspect, in addition to one or more of the preceding or following aspects, or in the alternative to some aspects, the implantable sensing device can further include a discrete temperature sensor, wherein the discrete temperature sensor is configured to send signals to the control circuit.

In a third aspect, in addition to one or more of the preceding or following aspects, or in the alternative to some aspects, the discrete temperature sensor is disposed adjacent to the optical detection assembly.

In a fourth aspect, in addition to one or more of the preceding or following aspects, or in the alternative to some aspects, the discrete temperature sensor is disposed between the optical detection assembly and a second optical detection assembly.

In a fifth aspect, in addition to one or more of the preceding or following aspects, or in the alternative to some aspects, the discrete temperature sensor is disposed adjacent to the sensing element.

In a sixth aspect, in addition to one or more of the preceding or following aspects, or in the alternative to some aspects, the discrete temperature sensor can include a thermistor.

In a seventh aspect, in addition to one or more of the preceding or following aspects, or in the alternative to some aspects, the implantable sensing device can further include a housing, the housing defining a hermetically sealed volume, wherein the discrete temperature sensor is disposed within the hermetically sealed volume.

In an eighth aspect, in addition to one or more of the preceding or following aspects, or in the alternative to some aspects, adjusting for the signals reflecting temperature includes normalizing the signals from the optical detection assembly based on a temperature value derived from the signals reflecting temperature.

In a ninth aspect, in addition to one or more of the preceding or following aspects, or in the alternative to some aspects, normalizing includes receiving correction values from a lookup table based on temperature and interpolating between received correction values.

In a tenth aspect, in addition to one or more of the preceding or following aspects, or in the alternative to some aspects, the control circuit is further configured to calculate an analyte amount based on the signals from the optical detection assembly while adjusting for the signals reflecting temperature.

In an eleventh aspect, in addition to one or more of the preceding or following aspects, or in the alternative to some aspects, the optical excitation assembly can include a light emitting diode.

In a twelfth aspect, in addition to one or more of the preceding or following aspects, or in the alternative to some aspects, the optical detection assembly can include a photodiode.

In a thirteenth aspect, in addition to one or more of the preceding or following aspects, or in the alternative to some aspects, the control circuit is configured to operate the implantable sensing device in a first mode and a second mode, the first mode including measuring a temperature-dependent electrical property of at least one of the optical excitation assembly and the optical detection assembly and the second mode including generating signals with the optical detection assembly based on received light from the sensing element, wherein operation in the first mode provides signals reflecting temperature.

In a fourteenth aspect, in addition to one or more of the preceding or following aspects, or in the alternative to some aspects, the control circuit is configured to cycle between the first mode and the second mode.

In a fifteenth aspect, a method of measuring a chemical analyte value within a patient is included, the method including illuminating a sensing element with an optical excitation assembly, receiving optical signals from a sensing element with an optical detection assembly, generating signals reflecting temperature, and processing signals from an optical detection assembly while adjusting for the signals reflecting temperature.

In a sixteenth aspect, in addition to one or more of the preceding or following aspects, or in the alternative to some aspects, the method can further include normalizing the signals from the optical detection assembly based on a temperature value derived from the signals reflecting temperature.

In a seventeenth aspect, in addition to one or more of the preceding or following aspects, or in the alternative to some aspects, generating signals reflecting temperature includes at least one of generating signals with a discrete temperature sensor and generating signals with a dual-function optical detection assembly or optical excitation assembly.

In an eighteenth aspect, in addition to one or more of the preceding or following aspects, or in the alternative to some aspects, the method can further include processing signals from an optical detection assembly while adjusting for the signals reflecting temperature includes receiving correction values from a lookup table relating values for an electrical property of an electronic component and temperature and interpolating between received correction values.

In a nineteenth aspect, in addition to one or more of the preceding or following aspects, or in the alternative to some aspects, the method can further include operating in a first mode and a second mode, the first mode including measuring a temperature-dependent electrical property of at least one of the optical excitation assembly and the optical detection assembly and the second mode including generating signals with the optical detection assembly based on received light from the sensing element, wherein operation in the first mode provides signals reflecting temperature.

In a twentieth aspect, in addition to one or more of the preceding or following aspects, or in the alternative to some aspects, the method can further include cycling between the first mode and the second mode.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
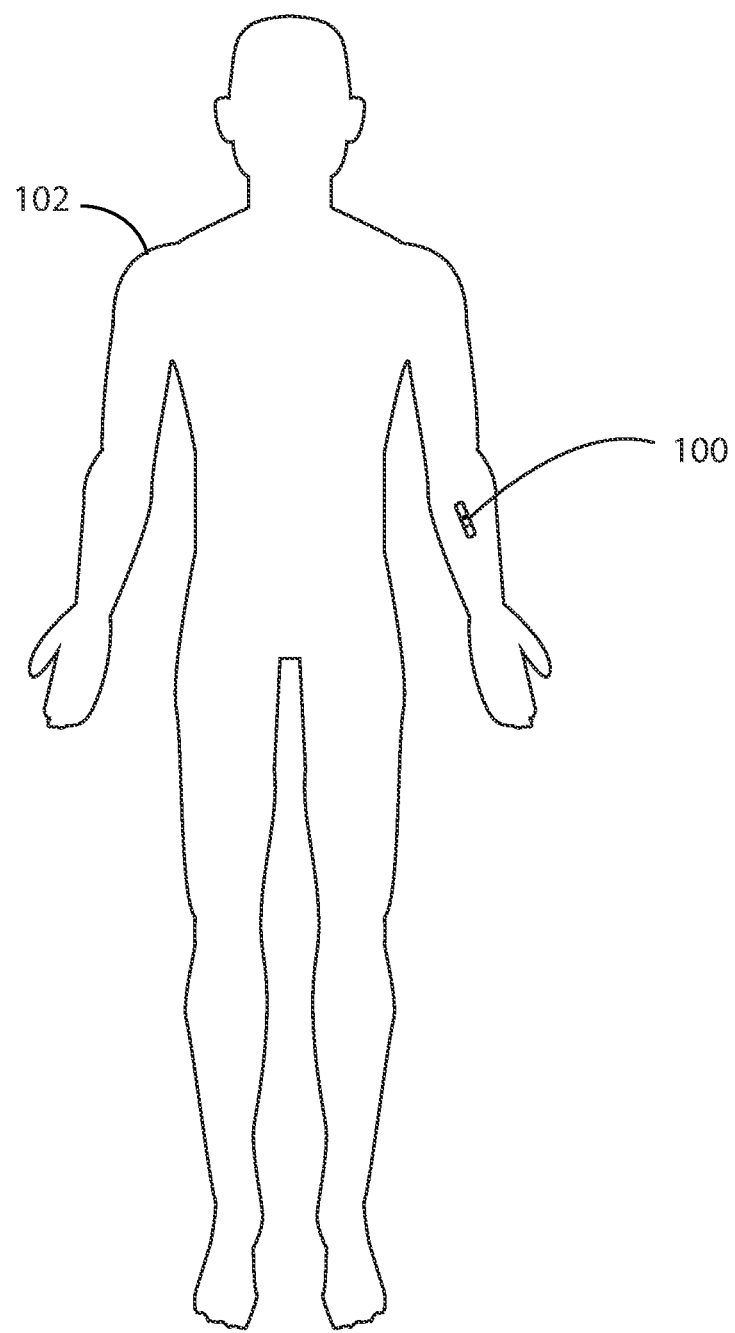
FIG. 1 is a schematic diagram of an implantable sensing device in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

The ability of a clinician to measure blood chemistry data in real time can be informative for monitoring the progression of a disease or for assessing the usefulness of a treatment regimen. However, measuring various blood chemistry data, including analyte concentrations within any of a number of bodily fluids can require drawing blood from a patient in a clinic, which generally requires the patient to physically visit a medical facility. As a result, despite their significance, analyte concentrations are frequently measured only sporadically.

Implantable sensing devices having integrated chemical sensors can offer a convenient alternative to the patient and clinician. Such implantable sensing devices can measure blood chemistry data, including analyte concentrations, continuously or semi-continuously at predetermined time intervals, and can provide a rich data set for the medical professional to evaluate. The devices can provide convenience to the patient by measuring in vivo blood chemistry data while the patient is away from the clinical setting. The devices can provide convenience to the clinician by receiving the data measurements via the Internet at any locale and can allow the clinician to interpret the condition of the patient or treatment efficiency in real time or near real time.

However, one drawback to some implantable sensing devices having integrated chemical sensors is the effect that local temperature variation has on the chemical sensor data. Variations in temperature can affect the electrical and optical properties of semiconductor materials used in optical detection assemblies, such as photodiodes. In the case of optical chemical sensors there exists a substantial amount of sensitivity to temperature variations and local temperature gradients. This can be problematic in various scenarios. For example, if a patient has a viral infection or another condition that causes their body temperature to rise the values provided by an implanted chemical sensor could be thrown off from true values. As another example, if an implanted sensing device is located within the extremities or the subcutaneous space then a patient spending time outside during a period of cooler temperatures may cause their implanted chemical sensor to generate spurious values for various chemical analytes.

Embodiments of implantable sensing devices herein can have a chemical sensor and an integrated temperature sensor intimately coupled to an optical detection assembly and the sensing elements and can provide accurate analyte concentration values despite temperature fluctuation such as may occur when implanted in areas of a patient's body where thermal gradients and variability occur. When temperature sensors are integrated with the chemical sensors described herein, the data they generate can be used to automatically compensate for any influence on the optical detection assembly materials due to thermal effects. The implantable sensing devices herein can execute algorithms to compensate for the effects of temperature variability on the analyte measurements and thermal lifetime limits of the chemical sensors described.

The implantable sensing devices described herein can be implanted at various sites within the body of a patient. Referring now to FIG. 1, a schematic diagram of an implantable sensing device is shown in accordance with various embodiments herein. FIG. 1 shows an implantable sensing device 100 implanted within the arm of a subject 102. It will be appreciated that implantable sensing device 100 can be implanted at any desired location within the body, including, but not to be limited to the arm, leg, abdomen, chest, hand, foot, neck, back, and the like. In some embodiments the implantable sensing device can be implanted subcutaneously. The implantable sensing device can measure analyte values within the interstitial fluid, serum, lymph, serous fluid, cerebrospinal fluid, and the like. The implantable sensing devices herein can be implanted within any animal and, in particular, within human patients.

Various analytes of interest can be measured by the implantable sensing devices embodied herein, including, but not to be limited to potassium, creatinine, glucose, magnesium, chloride, sodium, calcium, lithium, hydronium, phosphate, bicarbonate, urea, and the like. In an embodiment, the analyte of interest is potassium. In another embodiment, the analyte of interest is creatinine. In yet another embodiment, the analyte of interest is glucose. In some embodiments the implantable sensing device 100 can be configured to detect one or more of a protein, a sugar, a hormone, a peptide, an amino acid, or a metabolic byproduct.

Figure 2:
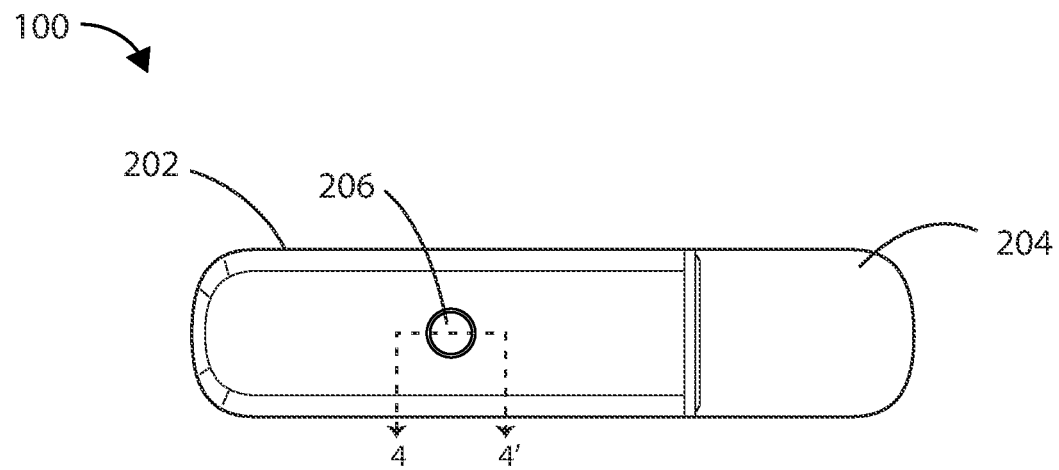
FIG. 2 is a schematic top plan view of an implantable sensing device in accordance with various embodiments herein.
Figure 3:
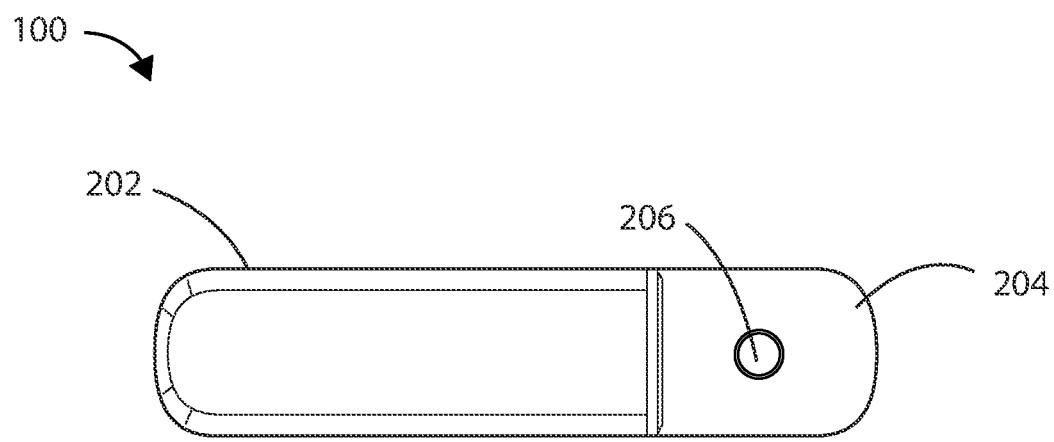
FIG. 3 is a schematic top plan view of an implantable sensing device in accordance with various embodiments herein.

Implantable sensing devices embodied herein can assume many shapes, sizes, and configurations suitable for placement within a subject. Referring now to FIG. 2 and FIG. 3, schematic top plan views of a sensing device are shown in accordance with various embodiments herein. While the implantable sensing devices shown in FIG. 2 and FIG. 3 are generally rectangular in shape, it will be appreciated that the shape of the implantable sensing devices can be square, oval, circular, trapezoidal, and the like.

FIG. 2 shows implantable sensing device 100 including a housing 202 and a header 204. The implantable sensing device 100 also includes a first chemical sensor 206 positioned along the housing 202. FIG. 3 shows an embodiment of implantable sensing device 100 also including a housing 202 and a header 204, wherein the first chemical sensor 206 is positioned along the header 204. It will be appreciated that the first chemical sensor 206 can be positioned anywhere along the length of the implantable sensing devices herein, and the placements shown in FIGS. 2 and 3 are for illustrative purposes only.

It will be appreciated that the implantable sensing devices herein can be implanted such that the chemical sensor 206 is implanted to be facing toward the interior of a patient's body (e.g., facing directly away from the surface of the skin). However, the implantable sensing device can also be implanted with other orientations. In some embodiments, the optical assemblies discussed herein can be shielded (such as using a shroud or a different type of shielding) from external light sources that may penetrate the skin surface and reach the implantable sensing device.

Various materials can be used to form the implantable medical devices described herein. In some embodiments, the housing 202 can be formed of a material such as a metal, ceramic, a polymer, or a composite. In various embodiments, the housing can define a hermetically sealed volume. The header 204 can be formed of various materials, including a translucent polymer, such as an epoxy material. In some embodiments the header 204 can be hollow. In other embodiments the header 204 can be filled with components and/or structural materials such as epoxy or another material such that it is non-hollow. In various embodiments, the header can define a hermetically sealed volume. In some embodiments, both the housing and header can both define a hermetically sealed volume. In some embodiments, a distinct header can be omitted.

Figure 4:
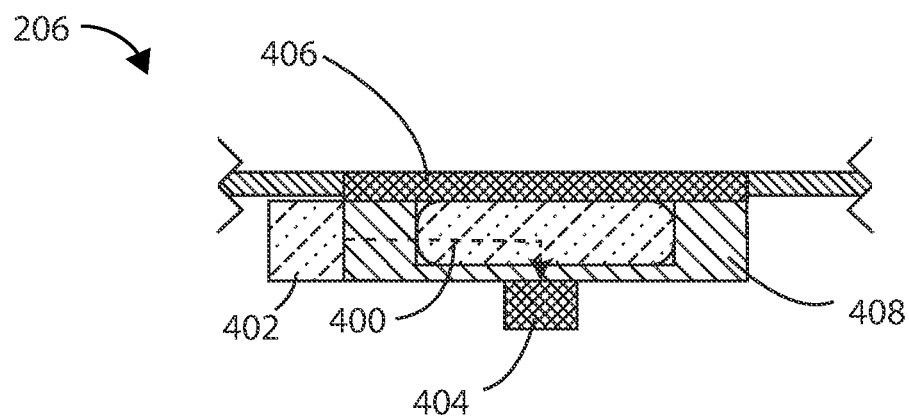
FIG. 4 is a schematic cross-sectional view of an implantable sensing device along line 3-3' of FIG. 2 in accordance with various embodiments herein.

Referring now to FIG. 4, a schematic cross-sectional view of the first chemical sensor 206 along line 4-4' of FIG. 2 is shown in accordance with various embodiments herein. The first chemical sensor 206 includes a first sensing element 400, an optical excitation assembly 402, and an optical detection assembly 404. The first chemical sensor 206 also includes a cover membrane 406 disposed over at least part of the first sensing element 400. The first sensing element 400 is disposed within an optical substrate 408 and hermetically sealed within the housing. The optical excitation assembly 402 can be configured to illuminate the first sensing element 400, and the optical detection assembly 404 can be configured to receive optical signals from the first sensing element 400. In various embodiments, the optical excitation assembly 402 can include a light emitting diode, and the optical detection assembly 404 can include a photodiode. Optical excitation assemblies and optical detection assemblies are described in more detail below.

The cover membrane 406 can be formed, in full or in part, from a permeable material, such as an ion permeable polymeric matrix material. In some embodiments, the cover membrane 406 can be permeable to sodium ions, potassium ions, hydronium ions, creatinine, urea, and various additional analytes as described elsewhere herein. In embodiments where the implantable sensing devices herein include more than one chemical sensor, each individual chemical sensor can include a unique cover membrane having different ion selectivity than the other chemical sensors present in the implantable sensing device. In other embodiments having more than one chemical sensor, each individual chemical sensor can include the same cover membrane. Cover membrane 406 can also include an active agent disposed therein including, but not limited to anti-inflammatory agents, angiogenic agents, and the like. Exemplary active agents are described in greater detail below.

The optical substrate 408 can be formed of many different materials. In some embodiments, the optical substrate 408 can include a polymer, a glass, a ceramic, or a composite. In various embodiments, the optical substrate 408 can be made from glass. In other embodiments, the optical substrate 408 can be made from one or more polymers.

The implantable sensing devices herein can include a control circuit (described further below), where the control circuit can be configured to control optical emission from the optical excitation assembly 402, receive signals from the optical detection assembly 404, and receive signals reflecting temperature. The control circuit can further be configured to process signals received from the optical detection assembly 404 while adjusting for the signals reflecting temperature, as will be discussed in more detail below.

Figure 5:
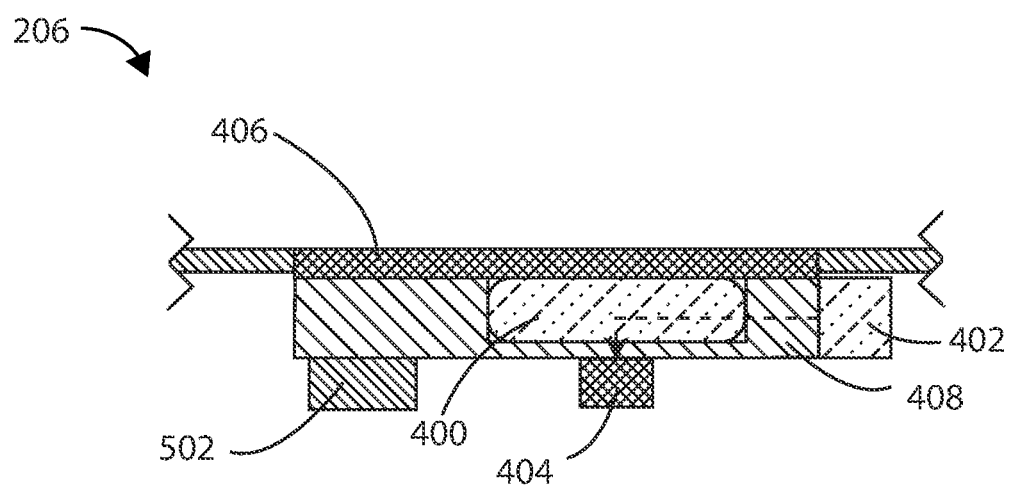
FIG. 5 is a schematic cross-sectional view of an implantable sensing device in accordance with various embodiments herein.

The implantable sensing devices herein further can include one or more thermal sensors associated with the chemical sensors. Referring now to FIG. 5, a schematic cross-sectional view of an embodiment of first chemical sensor 206 is shown in accordance with various embodiments herein. The first chemical sensor 206 includes a first sensing element 400, an optical excitation assembly 402, an optical detection assembly 404, a cover membrane 406, an optical substrate 408. The implantable sensing device further includes a temperature sensor 502.

In various embodiments, the temperature sensor 502 can be configured to send signals to the control circuit. In various embodiments, the temperature sensor 502 can be disposed adjacent to the optical detection assembly 404. In some embodiments, the temperature sensor 502 can be disposed between the optical detection assembly 404 and a second optical detection assembly 702, as will be discussed in reference to FIGS. 8 and 9. In various embodiments, the temperature sensor 502 can be disposed within the optical substrate 408. In other embodiments, the temperature sensor 502 can be disposed within the hermetically sealed volume of the housing or the header adjacent to the optical substrate 408. In various embodiments, the temperature sensor is in direct contact with the optical substrate 408. In some embodiments, the temperature sensor 502 can be configured to measure the local temperature within the components of the chemical sensor and to send signals to the control circuit (described further below).

The temperature sensors embodied herein can include one or more temperature sensing devices. In various embodiments, the temperature sensor 502 can include a thermistor. In other embodiments, the temperature sensor 502 can include a thermocouple, a resistance temperature detector (RTD), or a semiconductor based integrated circuit for measuring temperature.

In some embodiments, the optical detection assemblies and/or optical excitation assemblies as described herein can serve a dual purpose. For example, they can function as an optical detection assembly or an optical excitation assembly (first function) and as a temperature sensor (second function). Further details of how optical detection assemblies and/or optical excitation assemblies can be used to measure temperature are described in greater detail below.

Figure 6:
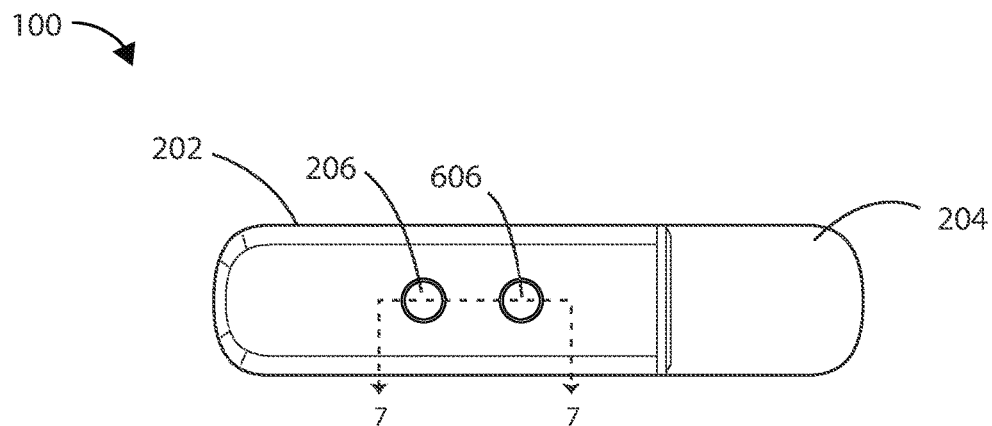
FIG. 6 is a schematic top plan view of an implantable sensing device in accordance with various embodiments herein.

In various embodiments herein the implantable sensing devices can include more than one chemical sensor. Referring now to FIG. 6, a schematic top plan view of an implantable sensing device is shown in accordance with various embodiments herein. Implantable sensing device 100 includes a housing 202 and a header 204. The implantable sensing device 100 includes a first chemical sensor 206 and a second chemical sensor 606. While the first chemical sensor 206 and second chemical sensor 606 are shown disposed along the housing 202, it will be appreciated that the first chemical sensor 206 and second chemical sensor 606 can be disposed within the header 204 as well.

Figure 7:
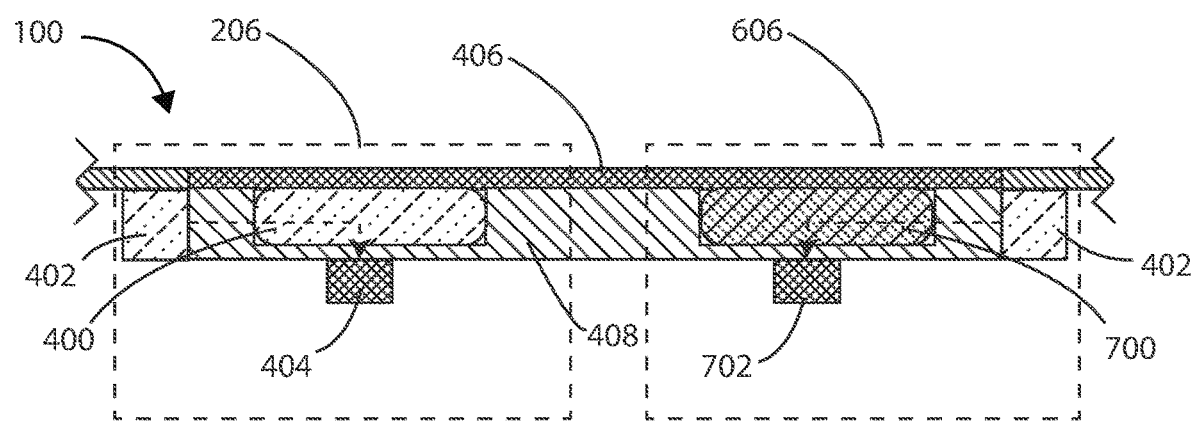
FIG. 7 is a schematic cross-sectional view of an implantable sensing device along line 7-7' of FIG. 7 in accordance with various embodiments herein.

Referring now to FIG. 7, a schematic cross-sectional view of the implantable sensing device 100 along line 7-7' of FIG. 6 is shown in accordance with various embodiments herein. The implantable sensing device 100 includes a first chemical sensor 206 and a second chemical sensor 606. The first chemical sensor 206 includes a first sensing element 400, an optical excitation assembly 402, and an optical detection assembly 404. The second chemical sensor 606 includes a second sensing element 700, an optical excitation assembly 402, and a second optical detection assembly 702. The first chemical sensor 206 and second chemical sensor 606 can be covered by a continuous cover membrane 406. It will be appreciated that each of the first and second chemical sensors can be individually covered by a unique, discontinuous cover membrane that does not span across the surface of each chemical sensor. The implantable sensing device 100 also includes an optical substrate 408, where each of the first sensing element 400 and the second sensing element 700 are embedded within the optical substrate 408. Suitable cover membrane and optical substrate materials are described elsewhere herein.

Figure 8:
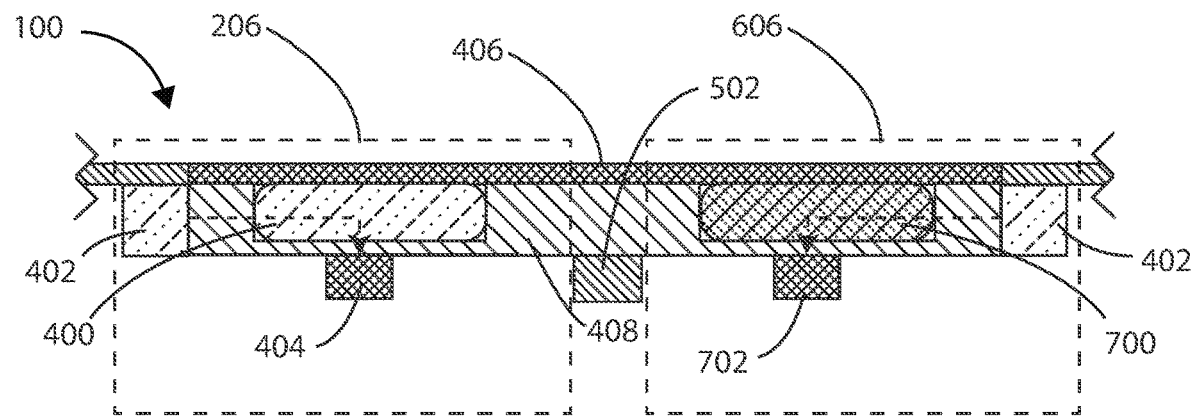
FIG. 8 is a schematic cross-sectional view of an implantable sensing device in accordance with various embodiments herein.
Figure 9:
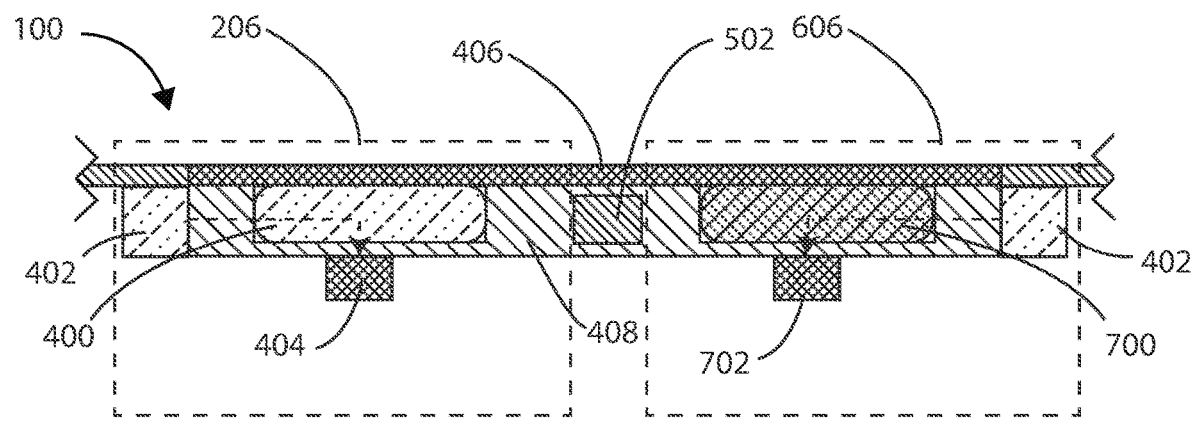
FIG. 9 is a schematic cross-sectional view of an implantable sensing device in accordance with various embodiments herein.

Implantable sensing devices having multiple chemical sensors can include various placement sites for the temperature sensors described. Referring now to FIG. 8 and FIG. 9, a schematic cross-sectional view of various embodiments of implantable sensing device 100 is shown in accordance with various embodiments herein. The implantable sensing devices 100 of FIG. 8 and FIG. 9 include a first chemical sensor 206 and a second chemical sensor 606. The first chemical sensor 206 includes a first sensing element 400, an optical excitation assembly 402, and an optical detection assembly 404. The second chemical sensor 606 includes a second sensing element 700, an optical excitation assembly 402, and a second optical detection assembly 702. The first chemical sensor 206 and second chemical sensor 606 can be covered by a continuous cover membrane 406. It will be appreciated that each of the first chemical sensor and second chemical sensor can be individually covered by a unique, discontinuous cover membrane that does not span across the surface of each chemical sensor. The implantable sensing device 100 also includes an optical substrate 408, where each of the first sensing element 400 and the second sensing element 700 are embedded within the optical substrate 408. The implantable sensing device also includes a temperature sensor 502.

In various embodiments, the temperature sensor 502 can be disposed between the first chemical sensor 206 and the second chemical sensor 606. In various embodiments, the temperature sensor 502 can be disposed between the optical detection assembly 404 of the first chemical sensor 206 and a second optical detection assembly 702 of the second chemical sensor. In various embodiments, the temperature sensor 502 can be disposed within the hermetically sealed volume of the housing adjacent the optical substrate 408 as shown in FIG. 8. In some embodiments, the temperature sensor 502 can be disposed within the hermetically sealed volume of the header adjacent the optical substrate 408 (not shown). In various embodiments, the temperature sensor 502 can be disposed within the optical substrate 408 between the first sensing element 400 and the second sensing element 700 as shown in FIG. 9. In other embodiments, a second temperature sensor can be disposed within the optical substrate or hermetically sealed volume of the housing or header adjacent to one or the other of the first sensing element and sensing element, such that each sensing element is associated with a unique temperature sensor. In various embodiments the implantable sensing devices herein include more than two temperature sensors. Temperature sensors will be described further below.

Figure 10:
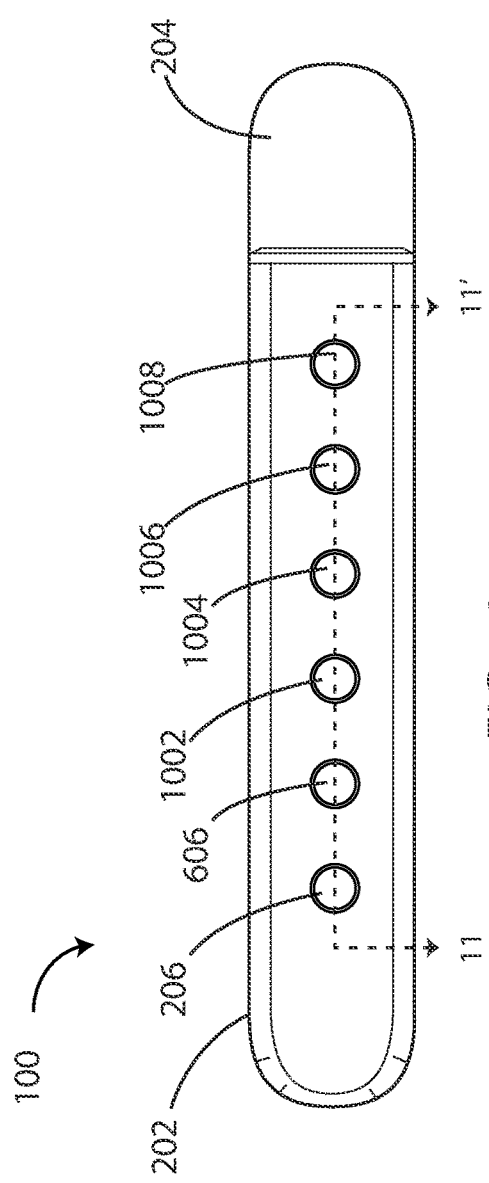
FIG. 10 is a schematic top plan view of an implantable sensing device in accordance with various embodiments herein.

Implantable sensing devices herein can include multiple chemical sensors capable of measuring the analyte concentration of the same or different analytes. Referring now to FIG. 10, a schematic cross-sectional view of an implantable sensing device 100 is shown in accordance with various embodiments herein. Implantable sensing device 100 includes six chemical sensors. While implantable sensing device 100 includes six chemical sensors, it will be appreciated that the implantable sensing devices herein can include more than six chemical sensors. In some embodiments, the implantable sensing devices can include one, two, three, four, five, six, seven, eight, nine, or ten chemical sensors. In other embodiments, the implantable sensing devices herein can include more than ten chemical sensors.

Figure 11:
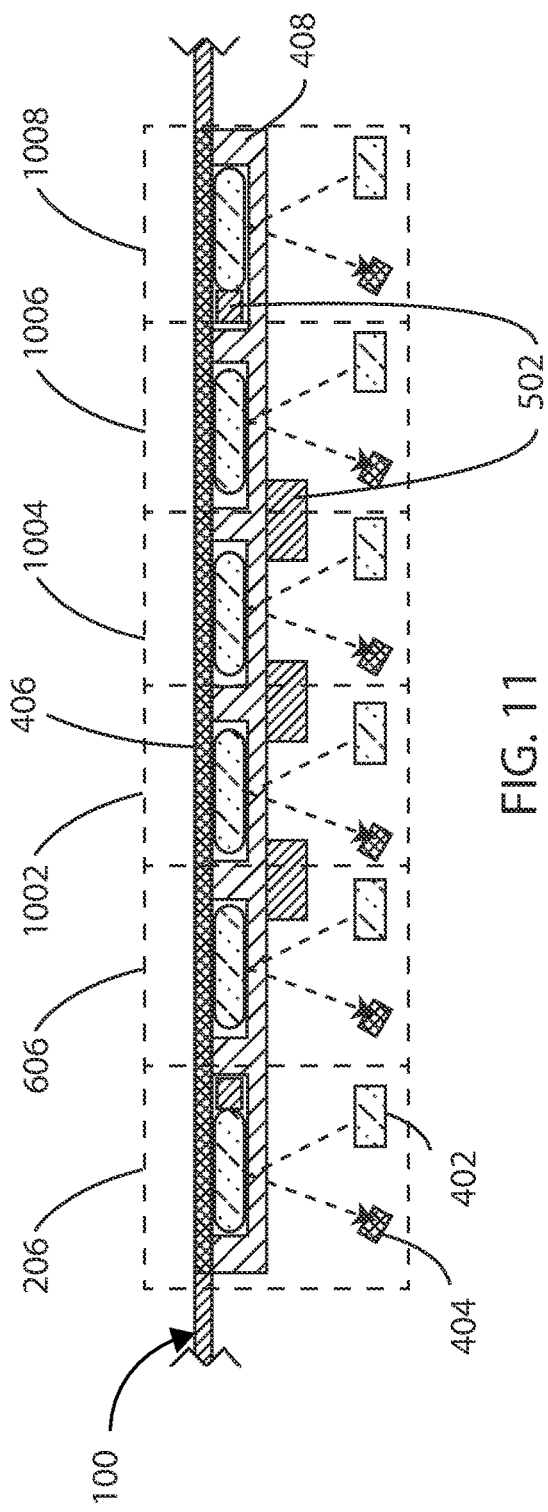
FIG. 11 is a schematic cross-sectional view of an implantable sensing device along line 11-11' of FIG. 10 in accordance with various embodiments herein.

The implantable sensing device 100 of FIG. 10 includes six chemical sensors, including a first chemical sensor 206, a second chemical sensor 606, a third chemical sensor 1002, a fourth chemical sensor 1004, a fifth chemical sensor 1006, and a sixth chemical sensor 1008. Referring now to FIG. 11, a schematic cross-sectional view of an implantable sensing device along line 11-11' of FIG. 10 is shown in accordance with various embodiments herein. Each of the chemical sensors of implantable sensing device 100 includes a sensing element, an optical excitation assembly 402 and an optical detection assembly 404. The implantable sensing device 100 also includes a cover membrane 406 disposed over the surface of each of the chemical sensors. The implantable sensing device further includes an optical substrate 408, where each of the sensing elements are disposed within the optical substrate 408.

The implantable sensing device 100 of FIG. 11 also includes multiple temperature sensors. In some embodiments, the temperature sensor 502 can be disposed between adjacent chemical sensors. In various embodiments, the temperature sensor 502 can be disposed adjacent to a sensing element and disposed within the optical substrate 408. In some embodiments, each chemical sensor can be intimately disposed next to a dedicated temperature sensor 502. In yet other embodiments, the temperature sensor 502 can be disposed adjacent to a sensing element and disposed within the optical substrate 408 in a well within the optical substrate.

Control Circuit

Various embodiments herein include a control circuit. Further details about the control circuits are provided as follows. However, it will be appreciated that this is merely provided by way of example and that further variations are contemplated herein.

The control circuits herein can be configured to control the optical excitation assemblies, to receive signals from the optical detection assemblies and to receive signals from the temperature sensors. The control of the electrical stimulus of the optical excitation assemblies can include turning on and turning off the excitation light directed at the sensing elements. The signals received by the control circuit from the optical detection assemblies can include light emitted by the sensing elements. The signals received by the control circuit from the temperature sensor can include signals reflecting a temperature of a sensing element or the area immediately adjacent and surrounding the sensing element. The control circuit, including a microprocessor, can process signals from the optical detection assembly while adjusting for the signals corresponding to temperature.

The control circuit can be configured to normalize signals received from an optical detection assembly with signals received from a temperature sensor. In various embodiments, adjusting for the signals reflecting temperature includes normalizing the signals received from an optical detection assembly based on a temperature value derived from the signals reflecting temperature. In various embodiments, normalizing includes receiving correction values from a lookup table based on temperature and interpolating between received correction values. Correction values can also be algorithmically calculated based on closed form equations, neural processing, machine learning, or stochastic modeling computations. Alternately, analog and/or nonlinear circuit processing can be applied to provide signal conditioning and or result correction and optimization based on sensor inputs.

The control circuit can be configured to calculate analyte values in a patient, such as in a patient's interstitial fluid. In various embodiments, the control circuit calculates an analyte amount based on the signals received from the optical detection assembly while adjusting for the signals reflecting temperature. Various components of the control circuit can be configured to process the data received to calculate one or more analyte concentrations. These components can include, but are not to be limited to a microprocessor, memory, recorder circuitry, and the like as described further below.

In various embodiments, the control circuit 1208 can be configured to operate the optical detection assemblies herein (and/or other electrical components described herein) in a first mode and a second mode as described further below.

Figure 12:
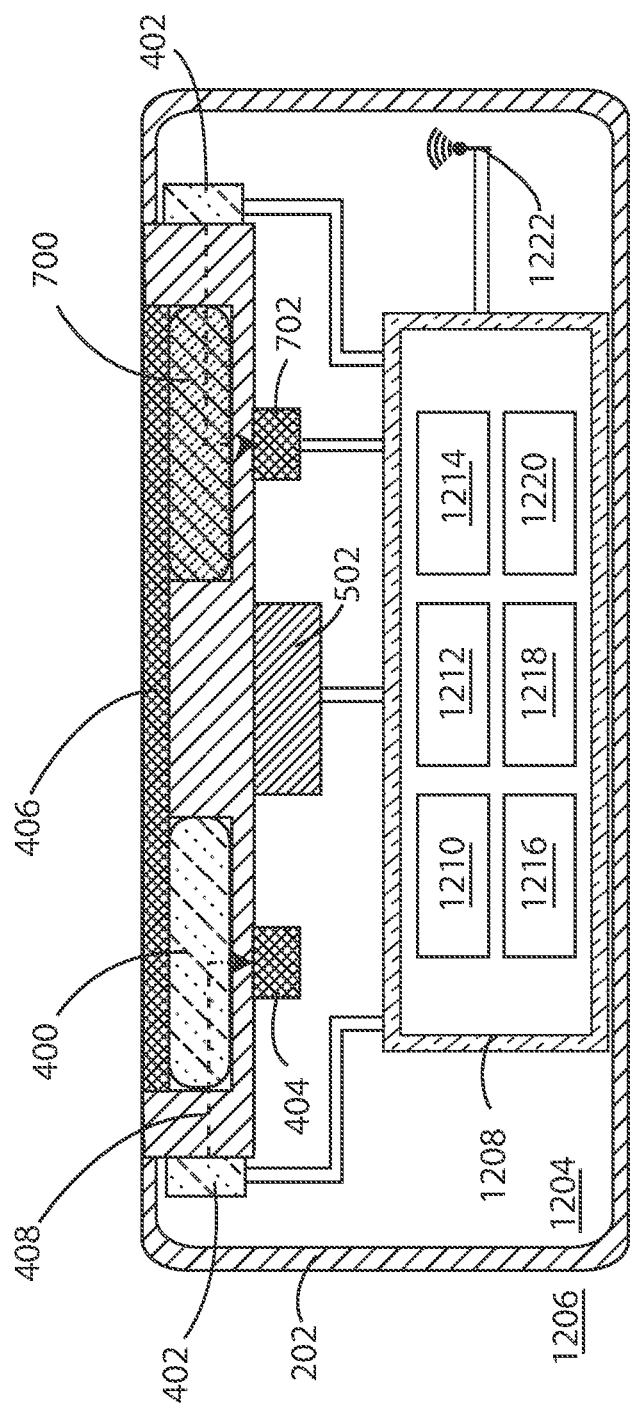
FIG. 12 is a schematic cross-sectional view of an implantable sensing device in accordance with various embodiments herein.

The control circuitry can include various components to facilitate the functions of the optical excitation assemblies, optical detection assemblies, and temperature sensors herein. Referring now to FIG. 12, a schematic diagram cross-sectional view of an implantable sensing device is shown in accordance with various embodiments herein. The implantable sensing device includes housing 202. Housing 202 can include a hermetically sealed internal volume 1204 sealed off from the area 1206 defining the outside environment. The implantable sensing device also includes a first chemical sensor including a first sensing element 400, an optical excitation assembly 402, and an optical detection assembly 404. The implantable sensing device also includes a second chemical sensor element including a second sensing element 700, an optical excitation assembly, and an optical detection assembly. The implantable sensing device also includes a cover membrane 406, an optical substrate 408, one or more temperature sensors 502, and a control circuit 1208. It will be appreciated that the temperature sensor 502 can be disposed within the hermetically sealed volume, can be incorporated into the optical substrate, or can be disposed within a well containing a sensing element, as described elsewhere herein.

The control circuit 1208 can include various components, such as components 1210, 1212, 1214, 1216, 1218, and 1220. In some embodiments, these components can be integrated and in other embodiments these components can be separate. In some embodiments, the components can include one or more of a microprocessor, memory circuitry (such as random access memory (RAM) and/or read only memory (ROM)), recorder circuitry, telemetry circuitry, chemical sensor interface circuitry, power supply circuitry (which can include one or more batteries), normalization circuitry, chemical sensor control circuitry, current to voltage converter, and the like. In some embodiments recorder circuitry can record the data produced by the chemical sensor and record time stamps regarding the same. In some embodiments, the circuitry can be hardwired to execute various functions, while in other embodiments the circuitry can be implemented as instructions executing on a microprocessor or other computation device.

A telemetry interface 1222 can be provided for communicating with external devices such as a programmer, a home-based unit, and/or a mobile unit (e.g., a cellular phone, portable computer, etc.). In some embodiments telemetry interface 1222 can be provided for communicating with additional implanted devices such as a therapy delivery device (e.g. a pacemaker, cardioverter-defibrillator) or monitoring-only device (e.g. an implantable loop recorder). In some embodiments, the circuitry can be implemented remotely, via either near-field, far-field, conducted, intra-body or extracorporeal communication, from instructions executing on any of the external or the implanted devices, etc. In some embodiments, the telemetry interface 1222 can be located within the housing 202. In some embodiments, the telemetry interface 1222 can be located in header 204.

Each optical excitation assembly 402 and each optical detection assembly 404 of the implantable sensing device can be in electrical communication with the control circuit 1208 within the hermetically sealed internal volume 1204. In some embodiments, the control circuit 1208 is configured to selectively activate each optical excitation assembly 402 and each optical detection assembly 404 of the chemical sensors. In various embodiments, the control circuit 1208 is configured to further calculate an analyte amount based on the signals from the optical detection assembly 404 while adjusting for the signals reflecting temperature.

Components of the Implantable Sensing Device

The implantable sensing devices embodied herein include various components. Further details about the components of the implantable sensing devices are provided as follows. However, it will be appreciated that this is merely provided by way of example and that further variations are contemplated herein.

Figure 13:
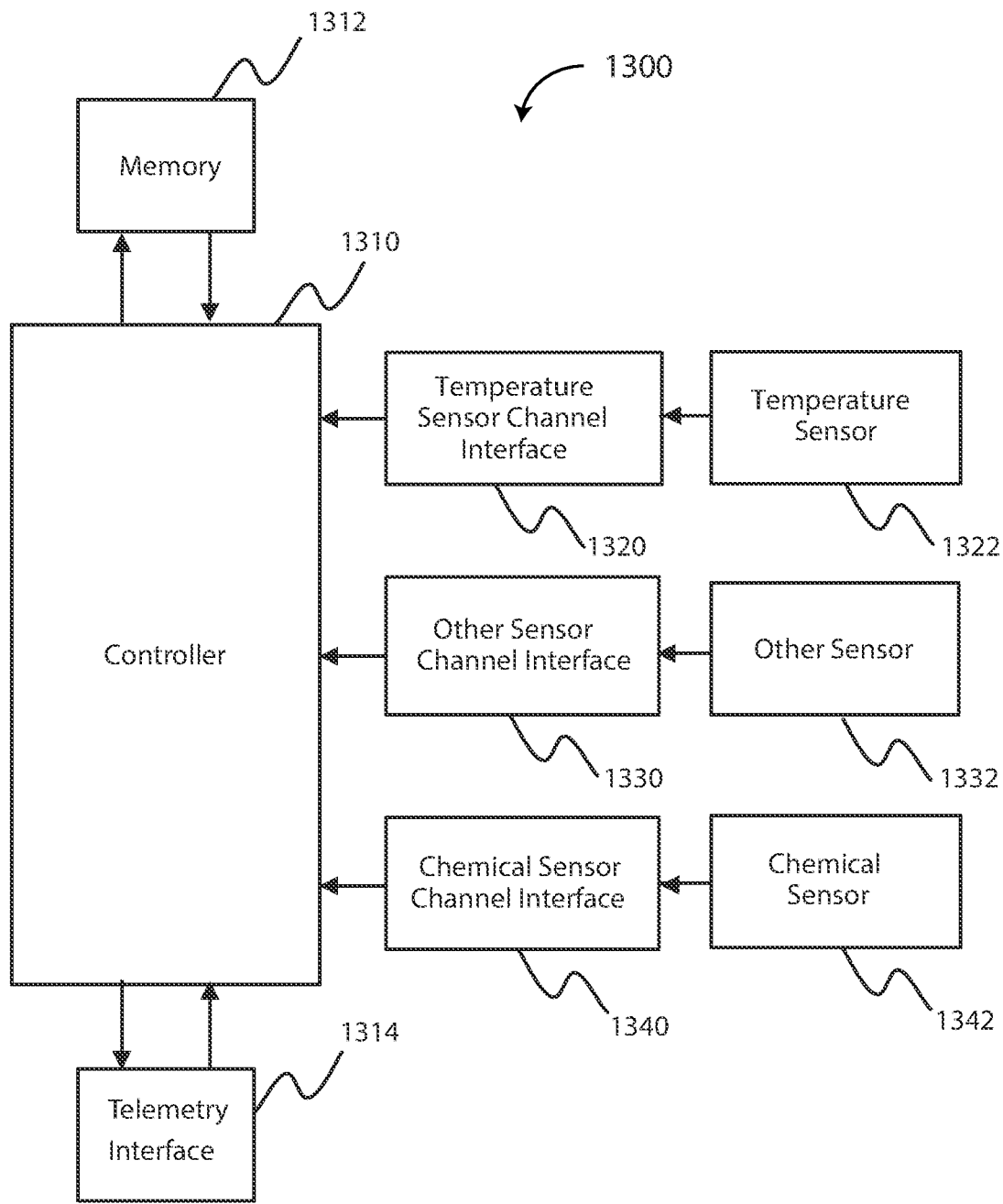
FIG. 13 is a schematic diagram of components of an implantable sensing device in accordance with various embodiments herein.

Referring now to FIG. 13, a schematic diagram of components 1300 of an implantable sensing device is shown in accordance with various embodiments herein. It will be appreciated that some embodiments can include additional elements beyond those shown in FIG. 13. In addition, some embodiments may lack some elements shown in FIG. 13. The implantable sensing devices herein can gather information through one or more sensing channels. A controller 1310 can communicate with a memory 1312 via a bidirectional data bus. It will be appreciated that controller 1310 can include one or more microprocessors. The memory 1312 can include read only memory (ROM) or random access memory (RAM) for program storage and RAM for data storage, or any combination thereof. The implantable medical device can include one or more temperature sensors 1322, one or more chemical sensors 1342, or one or more other sensors 1332.

Each temperature sensor 1322 is communicatively coupled to a temperature sensor channel interface 1320. Each chemical sensor 1342 is communicatively coupled to a chemical sensor channel interface 1340. Each other sensor 1332 is communicatively coupled to a separate and other sensor channel interface 1330. Each of the temperature sensor channel interface 1320, the chemical sensor channel interface 1340, and the other sensor channel interface 1330 can communicate with controller 1310.

The temperature sensor channel interface 1320, the chemical sensor channel interface 1340, and the other sensor channel interface 1330 can each include various components such as analog-to-digital converters for digitizing signal inputs, sensing amplifiers, registers which can be written to by the control circuitry in order to adjust the gain and threshold values for the sensing amplifiers, source drivers, modulators, demodulators, multiplexers, and the like. A telemetry interface 1314 is also provided for communicating with external devices such as a programmer, a home-based unit, and/or a mobile unit (e.g., a cellular phone, portable computer, etc.), implanted devices such as a pacemaker, cardioverter-defibrillator, loop recorder, and the like.

In some embodiments, the temperature channel can couple into the chemical sensor channel interface directly and introduce a signal that modifies the chemical sensor interface channel. This can be executed via analog or digital means, prior to the controller mediated processing events.

Methods

Many different methods are contemplated herein, including, but not limited to, methods of making, methods of using, and the like. Aspects of system/device operation described elsewhere herein can be performed as operations of one or more methods in accordance with various embodiments herein.

Figure 14:
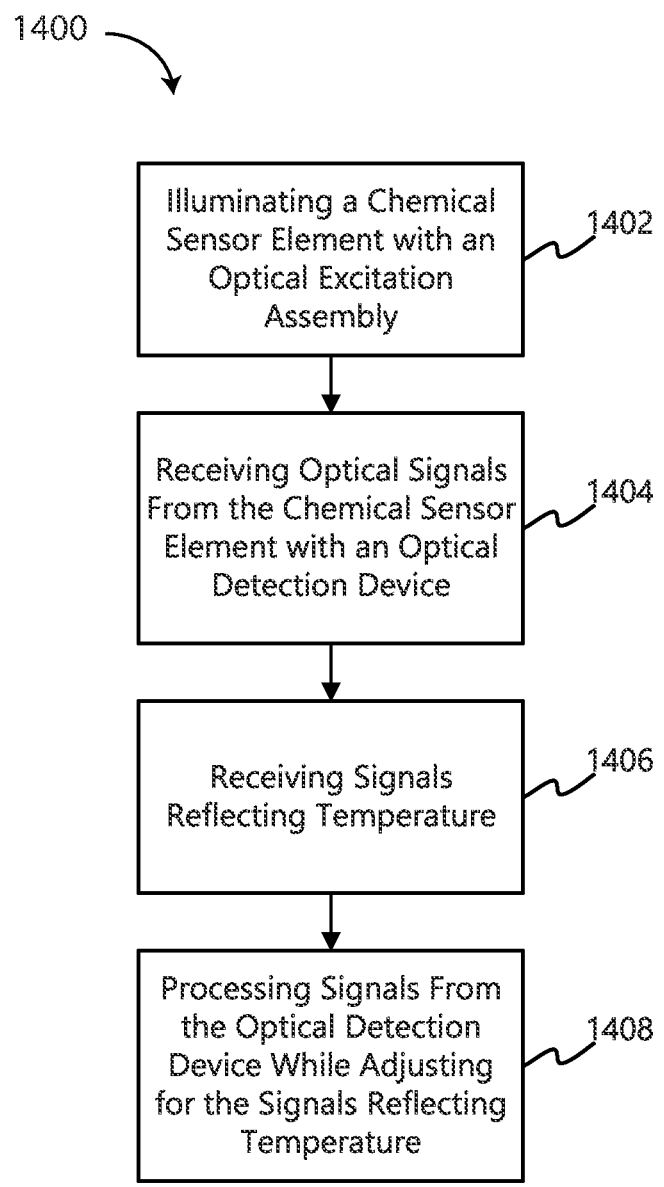
FIG. 14 is a flow diagram of a method of measuring an analyte value in accordance with various embodiments herein.

Referring now to FIG. 14, a flow diagram of a method is shown in accordance with various embodiments herein. FIG. 14 shows a method 1400 of measuring a chemical analyte value within a patient. The method can include an operation of illuminating 1402 a chemical sensor element with an optical excitation assembly. The method can include an operation of receiving 1404 optical signals from the chemical sensor element with an optical detection assembly. The method can include an operation of receiving 1406 signals reflecting temperature. The method can include an operation of processing 1408 signals from the optical detection assembly while adjusting for the signals reflecting temperature.

In various embodiments, the method of measuring a chemical analyte value within a patient herein can include: processing signals from the optical detection assembly while adjusting for the signals reflecting temperature, receiving signals reflecting temperature, receiving optical signals from the sensing element with an optical detection assembly, and illuminating a sensing element with an optical excitation assembly.

In various embodiments, the methods herein further can include normalizing the signals from the optical detection assembly based on a temperature value derived from the signals reflecting temperature. In various embodiments, the methods herein further can include processing signals from the optical detection assembly while adjusting for the signals reflecting temperature. In various embodiments, the methods herein further can include receiving correction values from a lookup table based on temperature and interpolating between received correction values.

In various embodiments, the methods herein further can include operating the optical detection assembly in a first mode and a second mode, the first mode including measuring a temperature-dependent electrical property of at least one of the optical excitation assembly and the optical detection assembly and the second mode including generating signals with the optical detection assembly based on received light from the sensing element, wherein operation in the first mode provides signals reflecting temperature.

In various embodiments, the methods herein further can include cycling between the first mode and the second mode. In various embodiments, the methods herein further can include calculating an analyte amount based on the signals from the optical detection assembly while adjusting for the signals reflecting temperature.

Temperature Sensors and Dual-Purpose Components

As referenced above, various components of the implantable sensing device can be sensitive to local temperatures at the implant site. The signals detected by the optical detection assemblies can thus be impacted by fluctuations in temperate if not corrected. For example, it is believed that that the signal produced by an optical detection assembly, such as a photodiode, based on incident light can shift in response to increases and decreases in temperature. Thus, analyte measurements can be normalized using correction factors to account for any measurement offset due to temperature alone.

The correction factors can be based on the current temperature which can be determined using a temperature sensor. Further details about the temperature sensors are provided as follows. However, it will be appreciated that this is merely provided by way of example and that further variations are contemplated herein.

The temperature sensors herein can be configured to send signals to the control circuit. The temperature sensors can be placed in proximity to the sensing elements to provide a temperature reading reflective of the local temperature within and surrounding the implantable medical device. Various placements for the temperature sensors are contemplated herein, including adjacent to an optical detection assembly, between one or more optical detection assemblies, within the optical substrate, or within a well that is defined by an optical substrate and immediately adjacent to a sensing element. The temperature sensor can be disposed within the hermetically sealed volume of the housing or the header. In various embodiments, the temperature sensor is in direct contact with the optical substrate. The temperature sensor can be configured to measure the local temperature within the components of the chemical sensor and to send signals to the control circuit.

The temperature sensors embodied herein can include one or more temperature sensing devices. In various embodiments, the temperature sensor can include a thermistor. In other embodiments, the temperature sensor can include a thermocouple, a resistance temperature detector (RTD), or a semiconductor based integrated circuit for sensing temperature. In various embodiments, the optical detection assemblies as described herein, including a photodiode, can serve as the temperature sensor.

In some embodiments, a discrete temperature sensor can be omitted. For example, another component can serve dual purposes. For example, another component (such as an optical detection assembly and/or an optical excitation assembly) as described herein can serve a dual purpose. For example, a component can function as an optical detection assembly or an optical excitation assembly (first function) and as a temperature sensor (second function). This is possible because of the impact of temperature on various electronic components.

By way of example a diode (including, but not limited to, a light emitting diode in the case of an optical excitation assembly, and a photodiode in the case of an optical detection assembly) exhibits a forward on threshold voltage (e.g., the minimum voltage needed to get the PN junction of the diode to conduct and allow current to flow in the forward direction). This value changes in a temperature dependent manner. The forward on threshold voltage can be measured by applying a forward bias current or a series of current steps and observing the resulting junction voltage(s). Data relating forward on bias current versus temperature can be stored in the device in a lookup table (or stored otherwise) and temperature can then be determined based on the measured forward on bias current.

As another example, a diode also exhibits a reverse break down voltage (e.g., the minimum reverse voltage that causes the PN junction of the diode to break down and allow current to flow in the reverse direction). This value also changes in a temperature dependent manner. The break down voltage can be measured by applying a reverse electrical potential and then monitoring to determine the necessary voltage to cause reverse current flow through the diode. Data relating break down voltages versus temperature can be stored in the device in a lookup table (or stored otherwise) and temperature can then be determined based on the measured breakdown voltage.

Similarly, various electrical properties (impedance, resistance, capacitance, etc.) of other electronic components can change in a temperature dependent manner and temperature can therefore be measured by measuring the change in such properties and then referencing stored data relating changes in the property with temperature.

While not intending to be bound by theory, the use of components forming the optical excitation assembly and/or the optical detection assembly in a dual-function role to also determine temperature is particular advantageous because it simplifies the construction of the device (e.g., potentially eliminating extra components) and it can measure temperature at the precise location(s) where temperature change may impact the output of the sensor thus offering more accurate temperature correction.

In some embodiments, such as where a discrete temperature sensor is used, the control circuitry can be configured to direct the temperature sensors to take a temperature measurement at the same time analyte measurements are taken by the optical detection device. In other embodiments, such as where a dual-function electronic component is used, measurements of temperature can be alternated with measurements of chemical analytes. For example, the system can be configured to operate in a first mode and a second mode. In various embodiments, the first mode can include applying an electrical stimulus to the optical detection assembly or another electronic component and measuring the output, wherein operation in the first mode provides signals reflecting temperature, and the second mode can include detecting an electrical property resulting from receiving optical excitation from the sensing element. In various embodiments, the control circuit can be configured to alternate between one or more cycles, including the first mode and the second mode.

In various embodiments, the control circuit can be configured to cycle between the first mode and the second mode. The control circuit can be configured to cycle between the first mode and the second mode at a frequency of from about 0.1 Hz to about 1000 Hz. In some embodiments, the frequency for cycling between a first mode and a second mode can be greater than or equal to 0.1 Hz, 1 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, or 1000 Hz or can be an amount falling within a range between any of the foregoing. In various embodiments, the frequency for cycling between a first mode and a second mode can be greater than 1000 Hz.

In various embodiments, each temperature measurement (whether taken by a discrete temperature sensor or with a dual-function electronic component) can be recorded with an associated time stamp. In various embodiments, and average temperature reading over a predetermined period of time can be used to correct data as measured by optical detection devices.

Sensing Elements

Various embodiments herein include one or more sensing elements. Further details about the sensing elements are provided as follows. However, it will be appreciated that this is merely provided by way of example and that further variations are contemplated herein.

In accordance with the embodiments herein, sensing elements can include one or more ion selective sensors included within one or more types of indicator beads. Ion selective sensors may either rely on surface phenomena or on concentration changes inside the bulk of a phase. Ion selective sensors can include optical sensors, including both non-carrier optical sensors and carrier-based optical sensors, and ion-selective electrodes (ISEs). In some embodiments, the ion selective sensor is fluorimetric, and can include a complexing moiety and a fluorescing moiety. Fluorimetric ion selective sensors can exhibit differential fluorescent intensity based upon the complexing of an analyte to a complexing moiety. In some embodiments, the ion selective sensor can be colorimetric, and can include a complexing moiety and a colorimetric moiety. Colorimetric ion selective sensors can exhibit differential light absorbance based upon the complexing of an analyte to a complexing moiety.

In some embodiments, the ion selective sensor comprises a non-carrier or carrier-based fluorescent or colorimetric ionophoric composition that comprises a complexing moiety for reversibly binding an ion to be analyzed, and a fluorescing or colorimetric moiety that changes its optical properties as the complexing agent binds or releases the ion. The complexing agents of the described can optionally be appended with one or more organic substituents chosen to confer desired properties useful in formulating the ion sensing composition. By way of example, the substituents can be selected to stabilize the complexing agent with respect to leaching into the solution to be sensed, for example, by incorporating a hydrophobic or polymeric tail or by providing a means for covalent attachment of the complexing agent to a polymer support within the ion selective sensor.

In some embodiments, the sensing element can include ion selective sensors such as an ionophore or a fluoroionophore. Suitable ionophores for use with the embodiments herein can include, but not be limited to, sodium specific ionophores, potassium specific ionophores, calcium specific ionophores, magnesium specific ionophores, and lithium specific ionophores. Suitable fluoroionophores for use with the embodiments herein can include, but not be limited to, lithium specific fluoroionophores, sodium specific fluoroionophores, and potassium specific fluoroionophores.

Exemplary ion selective sensors and methods for their use are disclosed in commonly assigned U.S. Pat. No. 7,809,441, the contents of which is herein incorporated by reference in its entirety.

Optical Excitation and Detection Assemblies

Various embodiments herein include an optical detection assembly and an optical excitation assembly. Further details about the optical detection assembly and optical excitations assemblies are provided as follows. However, it will be appreciated that this is merely provided by way of example and that further variations are contemplated herein.

In some embodiments, the optical excitation assembly can include solid state light sources such as GaAs, GaAlAs, GaAlAsP, GaAlP, GaAsP, GaP, GaN, InGaAlP, InGaN, ZnSe, or SiC light emitting diodes or laser diodes that excite the sensing element(s) at or near the wavelength of maximum absorption for a time sufficient to emit a return signal. However, it will be understood that in some embodiments the wavelength of maximum absorption/reflection varies as a function of concentration in the colorimetric sensor.

In some embodiments, the optical excitation assembly can include other light emitting components including incandescent components. In some embodiments, the optical excitation assembly can include a waveguide. The optical excitation assembly can also include one or more bandpass filters, high pass filter, low pass filter, antireflection elements, and/or focusing optics.

In some embodiments, the optical excitation assembly can include a plurality of LEDs with bandpass filters, each of the LED-filter combinations emitting at a different center frequency. According to various embodiments, the LEDs can operate at different center-frequencies, sequentially turning on and off during a measurement, illuminating the sensing element. As multiple different center-frequency measurements are made sequentially, a single unfiltered detector can be used in some embodiments. However, in some embodiments, a polychromatic source can be used with multiple detectors that are each bandpass filtered to a particular center frequency.

The sensing elements herein can include one or more types of indicator beads having embedded therein various types of ion selective sensors, described below. Physiological analytes of interest can diffuse into and out of the sensing elements and bind with an ion selective sensor to result in a fluorimetric or colorimetric response. Reference analytes can similarly diffuse into and out of the sensing elements and serve as a control sample. Exemplary ion selective sensors are described more fully below.

The optical detection assemblies can be configured to receive light from the sensing elements. In an embodiment, the optical detection assembly can include a component to receive light. By way of example, in some embodiments, the optical detection assembly can include a photodiode. In other embodiments, the optical detection assembly can include a charge-coupled device (CCD), a junction field effect transistor (JFET) type optical sensor, or a complementary metal-oxide semiconductor (CMOS) type optical sensor. In some embodiments, the optical detection assembly can include an array of optical sensing components. In some embodiments, the optical detection assembly can include a waveguide. The optical detection assemblies herein can also include one or more bandpass filters and/or focusing optics. In some embodiments, the optical detection assembly can include one or more photodiode detectors, each with an optical bandpass filter tuned to a specific wavelength range.

The optical excitation and detection assemblies as described herein can be integrated using bifurcated fiber-optics that direct excitation light from a light source to one or more sensing elements, or simultaneously to sensing element(s) and a reference channel. Return fibers can direct emission signals from the sensing element(s) and the reference channels to one or more optical detection assemblies for analysis by a processor, such as a microprocessor. In some embodiments, the optical excitation and detection assemblies are integrated using a beam-splitter assembly and focusing optical lenses that direct excitation light from a light source to the sensing element and direct emitted or reflected light from the sensing element to an optical detector for analysis by a processor.

Cover Membranes

As referenced above, the cover membrane of the sensing element can be formed of a permeable material. In some embodiments, the cover membrane can be formed from an ion-permeable polymeric matrix material. Suitable polymers for use as the ion-permeable polymeric matrix material can include, but are not limited to polymers forming a hydrogel. Hydrogels herein can include homopolymeric hydrogels, copolymeric hydrogels, and multipolymer interpenetrating polymeric hydrogels. Hydrogels herein can specifically include nonionic hydrogels.

In some embodiments, hydrogels herein can be prepared from polymerization of various monomers or macromers including one or more of poly 2-hydroxyethyl methacrylate (polyHEMA), 2-hydroxypropyl methacrylate (HPMA), acrylamide, acrylic acid, N-isopropylacrylamide (NIPAm), methoxyl polyethylene glycol monoacrylate (PEGMA), and the like. In some embodiments, polymers can include, but are not limited to polyhydroxyethyl methacrylate (HEMA), cellulose, polyvinyl alcohol, polyacrylate, dextran, polyacrylamides, polyhydroxyalkyl acrylates, polyvinyl pyrrolidones, and mixtures and copolymers thereof. In some embodiments, suitable polymers for use with the ion-permeable polymeric matrix described herein include those that are transparent.

In yet other embodiments, the cover membrane can be formed from porous materials such as, agarose, alginates, collagen, polyethylene glycol (PEG), gelatin, glass, borosilicate glass, or mixtures or derivatives thereof. In some embodiments, the cover membrane is formed from glass. In some embodiments, the cover membrane is formed from borosilicate glass.

Active Agents

Various embodiments herein can include an active agent disposed within the outer barrier layer. The active agent can be any drug or bioactive agent which can serve as a useful therapeutic, prophylactic, or even diagnostic agent when released into the patient. Exemplary bioactive agents include, but are not limited to, the following: an anti-inflammatory; anti-proliferative; anti-arrhythmic; anti-migratory; anti-neoplastic; antibiotic; anti-restenotic; anti-coagulation; anti-infectives; anti-oxidants; anti-macrophagic agents (e.g., bisphosphonates); anti-clotting (e.g., heparin, coumadin, aspirin); anti-thrombogenic; immunosuppressive agents; an agent that promotes healing; steroids (e.g., a glucocorticosteroid)); and combinations thereof.

Suitable active agents for use with the embodiments herein can specifically include, but are not limited to anti-inflammatory agents. In some embodiments, suitable anti-inflammatory agents can include steroids generally and, in specific, corticosteroids. In some embodiments, the anti-inflammatory agent can include ketorolac, dexamethasone, hydrocortisone, prednisolone, methylprednisolone, indomethacin, diclofenac, ketoprofen, piroxicam, metamizol magnesium and the like. In some embodiments, anti-inflammatory agents can be configured to be eluted shortly after implantation of the device.

In some embodiments, suitable active agents can also include angiogenic agents, to promote the in-growth of capillaries. In some embodiments, angiogenic agents can be configured to be eluted at a later time (e.g., following elution of an anti-inflammatory at an earlier point in time) to promote the ingrowth of capillaries to the chemical sensor.

In some embodiments, suitable angiogenic agents can include growth factors such as vascular endothelial growth factor (VEGF), fibroblast growth factor (FGF), platelet-derived growth factor (PDGF), and the like. In some embodiments, the additional active agents can include immobilized heparin to prevent blot clot formation.

Active agents herein can be in various forms including in a solution, as a suspension, as a particulate, or the like.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. An implantable sensing device comprising:
   a sensing element;
   an optical excitation assembly, wherein the optical excitation assembly is configured to illuminate the sensing element;
   an optical detection assembly, wherein the optical detection assembly is configured to receive optical signals from the sensing element; and
   a control circuit;
   wherein the control circuit is configured to
     receive signals from the optical detection assembly;
     receive signals reflecting temperature; and
     process signals from the optical detection assembly while adjusting for the signals reflecting temperature;
   a discrete temperature sensor disposed adjacent to the optical detection assembly,
   wherein the discrete temperature sensor is configured to send signals to the control circuit;
   wherein the control circuit is configured to direct the discrete temperature sensor to take a temperature measurement at the same time the optical detection assembly receives the optical signals from the sensing element,
   wherein the control circuit is further configured to cycle the implantable sensing device between a first mode and a second mode, the first mode including applying an electrical stimulus to the optical detection assembly and measuring a temperature-dependent electrical property of the optical detection assembly and the second mode including generating signals with the optical detection assembly based on received light from the sensing element, wherein operation in the first mode provides signals reflecting temperature, and wherein when in the second mode, an analyte amount is calculated based on the signals from the optical detection assembly while adjusting for the signals reflecting temperature.

2. The implantable sensing device of claim 1, wherein the discrete temperature sensor is disposed between the optical detection assembly and a second optical detection assembly.

3. The implantable sensing device of claim 1, wherein the discrete temperature sensor is disposed adjacent to the sensing element.

4. The implantable sensing device of claim 1, the discrete temperature sensor comprising a thermistor.

5. The implantable sensing device of claim 1, further comprising:
a housing, the housing defining a hermetically sealed volume;
wherein the discrete temperature sensor is disposed within the hermetically sealed volume.

6. The implantable sensing device of claim 1, wherein adjusting for the signals reflecting temperature includes normalizing the signals from the optical detection assembly based on a temperature value derived from the signals reflecting temperature.

7. The implantable sensing device of claim 6, wherein normalizing includes receiving correction values from a lookup table based on temperature and interpolating between received correction values.

8. The implantable sensing device of claim 1, wherein the control circuit is further configured to calculate an analyte amount based on the signals from the optical detection assembly while adjusting for the signals reflecting temperature.

9. The implantable sensing device of claim 1, the optical excitation assembly comprising a light emitting diode.

10. The implantable sensing device of claim 1, the optical detection assembly comprising a photodiode.

11. The implantable sensing device of claim 1, wherein the control circuit is configured to operate the implantable sensing device in a first mode and a second mode, the first mode including measuring a temperature-dependent electrical property of at least one of the optical excitation assembly and the optical detection assembly and the second mode including generating signals with the optical detection assembly based on received light from the sensing element, wherein operation in the first mode provides signals reflecting temperature.

12. The implantable sensing device of claim 11, wherein the control circuit is configured to cycle between the first mode and the second mode.

13. An implantable sensing device comprising:
a sensing element;
an optical excitation assembly, wherein the optical excitation assembly is configured to illuminate the sensing element;
an optical detection assembly, wherein the optical detection assembly is configured to receive optical signals from the sensing element; and
a control circuit;
wherein the control circuit is configured to
receive signals from the optical detection assembly;
receive signals reflecting temperature; and
process signals from the optical detection assembly while adjusting for the signals reflecting temperature;
wherein at least one of the optical excitation assembly and the optical detection assembly is further configured to serve as a temperature sensor; and
wherein the control circuit is further configured to cycle the implantable sensing device between a first mode and a second mode, the first mode including applying an electrical stimulus to the optical detection assembly and measuring a temperature-dependent electrical property of the optical detection assembly and the second mode including generating signals with the optical detection assembly based on received light from the sensing element,
wherein operation in the first mode provides signals reflecting temperature, and
wherein when in the second mode, an analyte amount is calculated based on the signals from the optical detection assembly while adjusting for the signals reflecting temperature.

14. The implantable sensing device of claim 12, wherein the first mode and the second mode cycle at a frequency between 0.1 Hz and 1000 Hz.

15. The implantable sensing device of claim 6, wherein normalizing the signals comprises algorithmically calculating correction values based on closed-form equations, stochastic modeling computations, neural processing, or machine learning.

* * * * *